(12) United States Patent
Jarman et al.

(10) Patent No.: US 9,015,571 B2
(45) Date of Patent: Apr. 21, 2015

(54) SYNCHRONIZING FILTER METADATA WITH A MULTIMEDIA PRESENTATION

(75) Inventors: Matthew T. Jarman, Salt Lake City, UT (US); Christopher Venn, Fayetteville, GA (US); Brent L. Iverson, Lehi, UT (US)

(73) Assignee: ClearPlay, Inc., Salt Lake City, UT (US)

( * ) Notice: Subject to any disclaimer, the term of this patent is extended or adjusted under 35 U.S.C. 154(b) by 1186 days.

(21) Appl. No.: 11/669,138

(22) Filed: Jan. 30, 2007

(65) Prior Publication Data

US 2007/0186235 A1 Aug. 9, 2007

Related U.S. Application Data

(60) Provisional application No. 60/763,525, filed on Jan. 30, 2006, provisional application No. 60/785,547, filed on Mar. 24, 2006.

(51) Int. Cl.
| | |
|---|---|
| G06F 17/00 | (2006.01) |
| H04N 21/45 | (2011.01) |
| H04N 7/16 | (2011.01) |
| H04N 7/173 | (2011.01) |
| H04N 21/242 | (2011.01) |
| H04N 21/258 | (2011.01) |
| H04N 21/454 | (2011.01) |
| H04N 21/472 | (2011.01) |
| H04N 21/84 | (2011.01) |
| H04N 21/845 | (2011.01) |

(52) U.S. Cl.
CPC .......... H04N 21/4532 (2013.01); H04N 7/163 (2013.01); H04N 7/17318 (2013.01); H04N 21/242 (2013.01); H04N 21/25891 (2013.01); H04N 21/4542 (2013.01); H04N 21/47202 (2013.01); H04N 21/84 (2013.01); H04N 21/8456 (2013.01)

(58) Field of Classification Search
CPC .......... H04N 21/4532; H04N 21/4542; H04N 21/4755; H04N 21/4751; H04N 21/454; H04N 21/482
USPC ............................... 715/202, 203; 725/28, 29
See application file for complete search history.

(56) References Cited

U.S. PATENT DOCUMENTS

| 7,054,547 | B1 * | 5/2006 | Abecassis | 386/68 |
|---|---|---|---|---|
| 7,249,366 | B1 * | 7/2007 | Flavin | 725/25 |
| 2003/0192044 | A1 * | 10/2003 | Huntsman | 725/25 |
| 2004/0261099 | A1 * | 12/2004 | Durden et al. | 725/32 |
| 2005/0086069 | A1 * | 4/2005 | Watson et al. | 705/1 |

* cited by examiner

Primary Examiner — Adam M Queler
(74) Attorney, Agent, or Firm — Polsinelli PC

(57) ABSTRACT

A method, system and apparatus for applying and synchronizing filter information with a multimedia presentation, such as a movie provided in a video-on-demand context, to suppress objectionable content. In one example, filter information, which includes an indicia of a portion of the multimedia presentation including objectionable content and a type of suppression action, is provided on either a set-top-box or a video-on-demand server. A user selects a particular video-on-demand presentation, and the selection is transmitted to the set-top-box. Filtering may take place at the set-top-box side such that the complete video-on-demand movie is transmitted to the set-top box and then content suppression, such as skipping, muting, cropping, and blurring, takes place at the set-top-box. Alternatively, some or all suppression may take place at the server such that some or all of the objectionable content is not transmitted to the set-top-box. Additionally, whether in a video-on-demand, DVD, or other environment it may be necessary to synchronize filter with the multimedia content so that the proper objectionable content is suppressed.

40 Claims, 19 Drawing Sheets

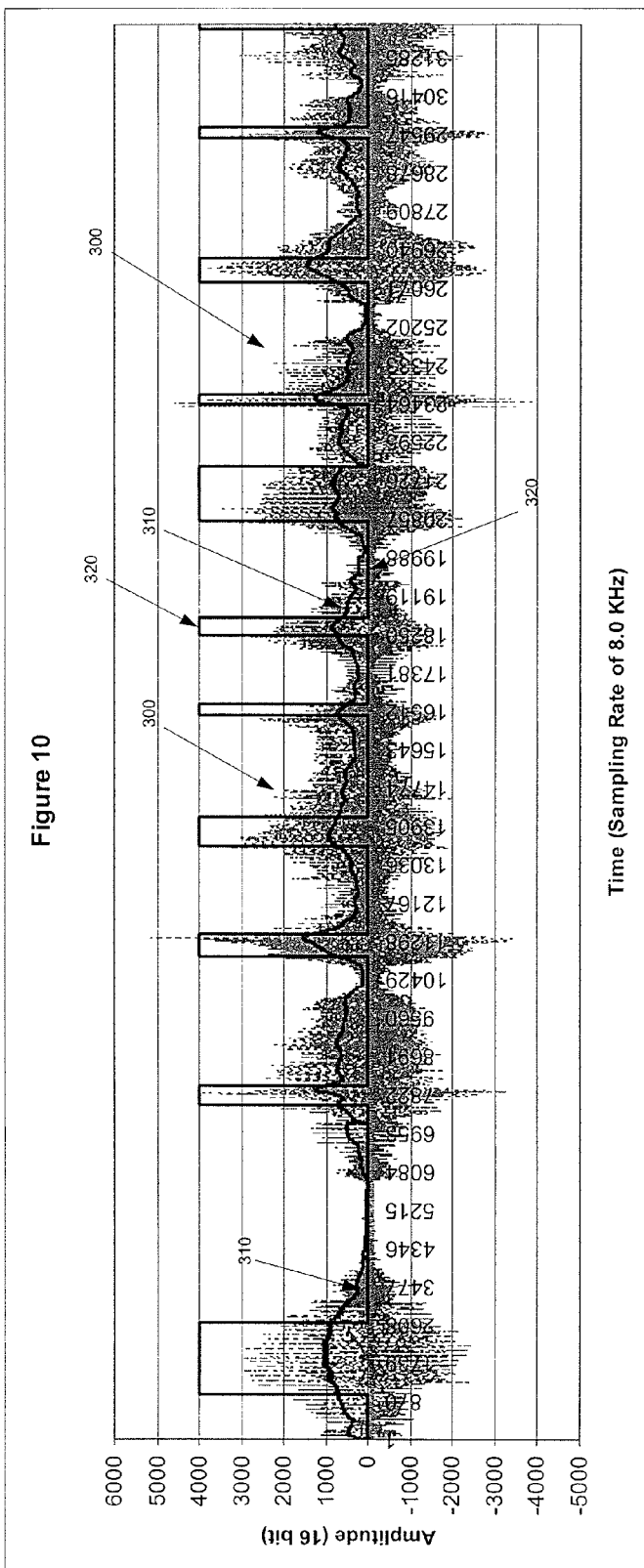

SYNCHRONIZING FILTER METADATA WITH A MULTIMEDIA PRESENTATION

CROSS-REFERENCE TO RELATED APPLICATIONS

The present non-provisional application claims priority under 25 U.S.C. §119(e) to U.S. provisional application No. 60/763,525 titled "Filtering a Multimedia Presentation in a Video On Demand Environment" filed Jan. 30, 2006, and to U.S. provisional application No. 60/785,547 titled "Synchronizing Filter Meta-data with a Multimedia Presentation" filed Mar. 24, 2006, which are both hereby incorporated by reference herein.

FIELD OF THE INVENTION

Aspects of the present invention generally involve a system, method, apparatus, and computer program products for suppressing or "filtering" certain multimedia content. One particular aspect of the present invention involves filtering multimedia content in a video on demand environment. Another particular aspect of the present invention involves synchronizing filter information with multimedia content irrespective of the environment.

BACKGROUND

Video-on-demand, pay-per-view and other movies and multimedia content presentations that are transmitted to a client device, such as a cable or satellite set-top-box, a personal computer or the like or read from a removable storage media, such as a CD, DVD or the like, often contain some content, whether audio, video, embedded links, etc., that is inappropriate for some audiences or simply undesirable for some audiences. For example, it is well known that some multimedia presentations, whether music on a CD, a movie on DVD, various television channels, etc., can contain language and explicit content not suitable for children. Thus, it would be useful for a parent to be able to suppress the unsuitable content, while still allowing their children to view the non-objectionable portions of the presentation. It would also be useful for others to be able to suppress certain content they may personally find undesirable, but still be able to view and/or listen to certain multimedia content presentations. Such usefulness would be particularly beneficial in video-on-demand and other similar content provisions platforms where suitable filtering applications are not presently widely available. Such usefulness would also be particularly beneficial if the suppression is accurately synchronized with the presentations to minimize the suppression of non-objectionable content.

SUMMARY

One aspect of the present invention involves a method for suppressing some multimedia content of a multimedia content presentation supplied from a remote server to a client multimedia content playback device. The method comprises providing for selection of at least one multimedia content presentation from a plurality of multimedia content presentations. The method further comprises providing for activation of at least one filter to apply to the at least one multimedia content presentation, the at least one filter configured to identify a portion of the multimedia content presentation having objectionable content and further configured to implement content suppression of the objectionable content. Additionally, the method comprises providing for communication of the multimedia content presentation between the remote content server and the client device. Finally, the method comprises providing for applying the at least one filter to the multimedia content presentation to suppress the objectionable content identified in the at least one filter.

Another aspect of the present invention involves a method for applying and synchronizing multimedia content filter data with a multimedia content presentation. The method comprises receiving filter data comprising at least one filter configured to identify a portion of a multimedia content presentation having objectionable content and further configured to implement content suppression of the objectionable content. Further, the method comprises providing for presentation of the multimedia content presentation, the multimedia content presentation having objectionable content identified in the at least one filter. Finally, the method comprises obtaining synchronization information to synchronize the at least one filter with the objectionable content when a location of the portion of the multimedia content presentation may vary.

Another aspect of the present invention involves a method for suppressing some multimedia content of a multimedia content presentation supplied from a remote server to a client multimedia content playback device. The method comprises receiving a selection of at least one multimedia content presentation from a plurality of multimedia content presentations. Additionally, the method comprises transmitting filter metadata to the client device, the filter metadata including at least one filter configured to identify a portion of the multimedia content presentation having objectionable content and further configured to implement content suppression of the objectionable content. Finally, the method comprises transmitting the multimedia content presentation from the remote content server to the client device such that application of the filter metadata to the multimedia content presentation will suppress the objectionable content identified in the filter.

BRIEF DESCRIPTION OF THE DRAWINGS

FIG. 10 is a graph illustrating various audio techniques applicable to synchronization of content suppression filters with a multimedia presentation.

DETAILED DESCRIPTION OF EMBODIMENTS OF THE INVENTION

Aspects of the present invention generally involve the suppression of certain content in a multimedia presentation. The multimedia presentation may come from various possible sources, including digital video disc (DVD), video-on-demand (VOD), streaming video, various optical and magnetic storage media, pay-per-view, etc, and may be in various possible encoding and digitization forms, including various Moving Picture Experts Group (MPEG) coding formats, QuickTime, various streaming formats, and the like. The suppression may take on various forms, including skipping certain portions of the multimedia presentation, muting audio portions, cropping portions of scene, blurring the image, etc. The identification of portions of a multimedia presentation possibly subject to suppression may be implemented with filters that identify some portion of a multimedia presentation and identify the type of possible suppression actions that may be applied against the multimedia presentation. A filtering application accepts user filter activations and then synchronizes the filters with the multimedia presentation. When a portion of the multimedia presentation subject to an activated filter is identified the appropriate suppression action or actions are taken.

Figure 1:
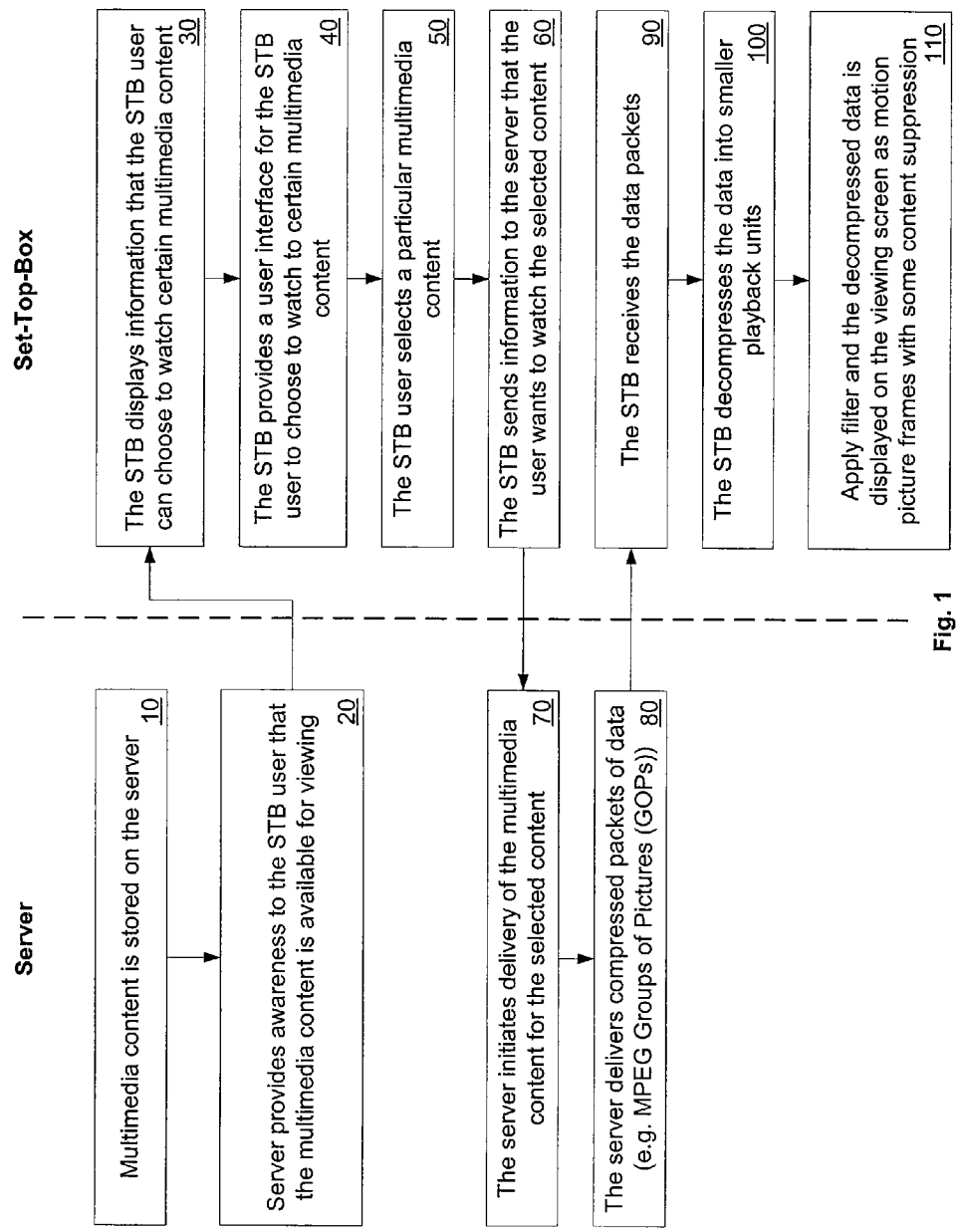
FIG. 1 is a flowchart illustrating one method of suppressing objectionable content from a video-on-demand presentation conforming to one particular implementation of the present invention.

With VOD technology there are generally two hardware environments that communicate with each other: 1) a multimedia content server and 2) the multimedia content set-top box (STB). FIG. 1 is a flowchart illustrating various operations 10-110 associated with an interaction between a VOD server and a STB whereby a user may select some form of multimedia presentation and the presentation is delivered to the STB for presentation. In the particular example set forth in FIG. 1 as well as other drawings set forth herein, the multimedia is compressed or encoded audio and video (e.g., a movie), such as through a Moving Picture Experts Group ("MPEG") coding formats. The STB receives the compressed data and processes it for display with some content suppressed in accordance with filter settings.

Now, with respect to FIG. 1, multimedia content, such as a VOD movie including audio and video content, is stored on or in association with a multimedia content server, such as VOD server (operation 10). The STB and the content server communicate such that available multimedia content is presented to the user, such as by providing on-screen menus listing all available VOD titles, which may be organized by genre (horror, action, children, action, etc.) or in other ways (operations 20 and 30). The STB provides a user interface to select or purchase any particular multimedia content or perhaps a collection of content (operation 40). In some instances a provider may provide some content free of charge and in other instances the service provider charges a fee. Typically, the fee is automatically applied to a monthly bill, but in other instances a phone system (e.g., a user must call in to order a movie and a signal is transmitted to the STB) or on-screen direct payment interface may be required (e.g., a user must affirmatively enter credit card information). A user then selects a particular title (operation 50) and the STB communicates with the content server that the user has selected the title (operation 60). Upon receipt of the content selection, the server initiates delivery of the content (operation 70) and the server begins to transmit the content to the STB (operation 80). In some particular VOD configurations, the server delivers compressed packets of data in the form of MPEG Groups of Pictures (GOP), which is discussed in greater detail below. The server receives the packets (operation 90) and begins to decompress the packets (100). In accordance with aspects of the present invention, certain objectionable portions of the content may be suppressed according to filter settings selected by the user, such that the data is displayed with the objectionable content suppressed (operation 110).

Figure 2A:
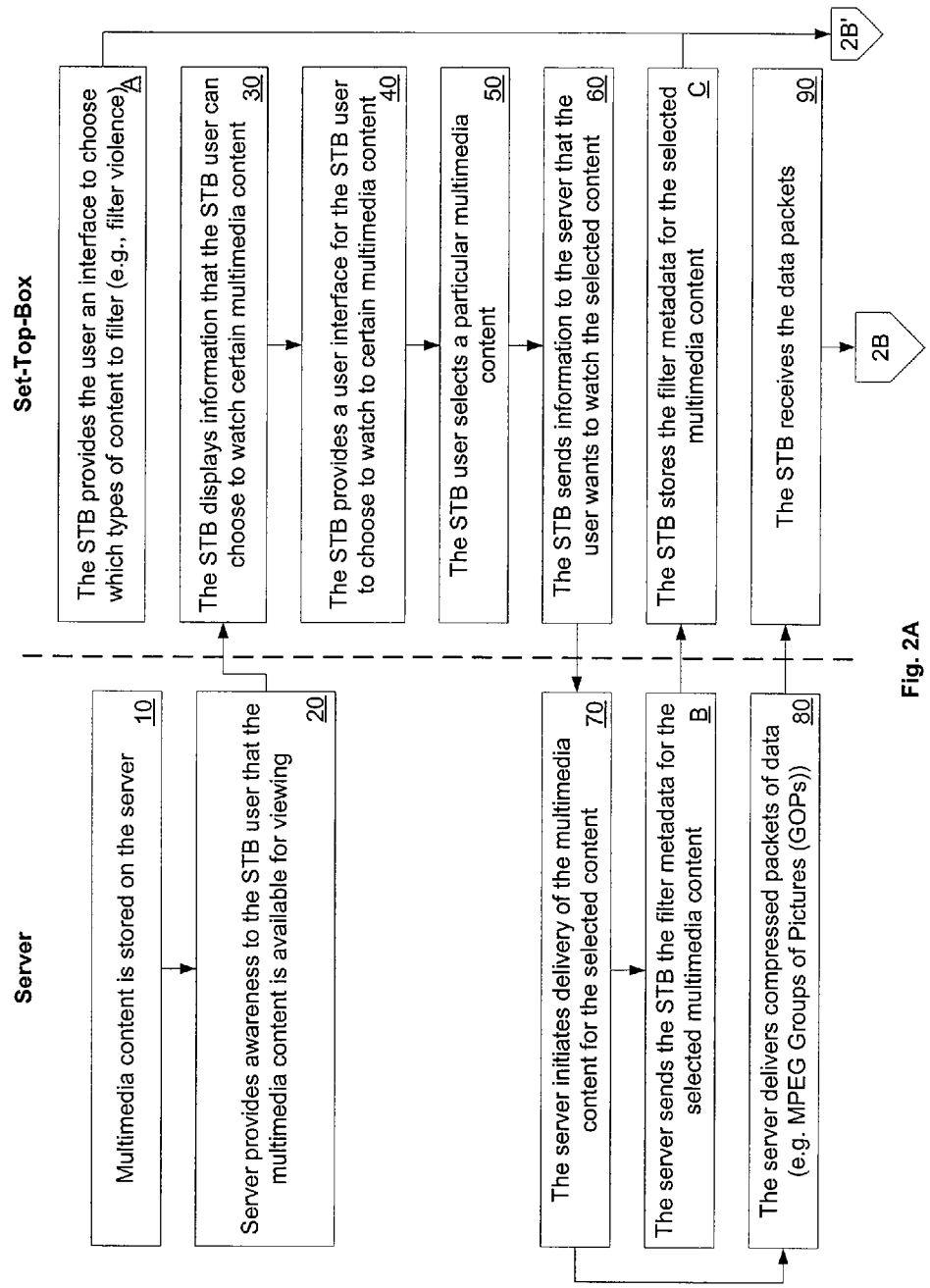
FIGS. 2A and 2B are a flowchart illustrating a second method of suppressing objectionable content from a video-on-demand presentation conforming to one particular implementation of the present invention.
Figure 2B:
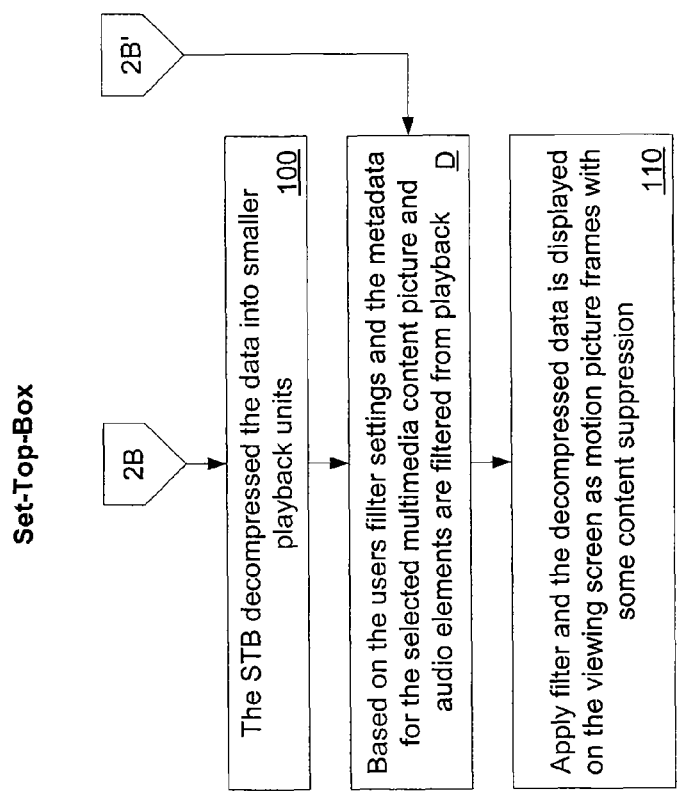

Aspects of the present invention involve systems, methods, apparatus, and computer program products that filter various forms of content from the multimedia presentation supplied in a video on demand environment. FIGS. 2A and 2B are a flowchart illustrating one particular method for facilitating filtered playback of a VOD presentation. The operations set forth in FIGS. 2A-2B (collectively "FIG. 2") include the same operations 10-110 set forth in FIG. 1. Additionally, FIG. 2 includes operations A-D. First, operation A provides a user with an input mechanism to choose types of content to filter. One example of an input mechanism in the form of an on-screen selection menu is set forth in U.S. patent application Ser. No. 11/104,924 titled "Apparatus, System, and Method for Filtering Objectionable Portions of Multimedia Presentation," filed on Apr. 12, 2005 (the '924 application), which is hereby incorporated by reference herein. The filter settings may be stored on the STB, the server, or elsewhere. Thus, for example, the user could access a filter selection menu on a third computing platform, such as a PC. The filter settings are then made available to the STB for operation C (described below). For example, the filter settings could be entered on a computer and sent to the server or STB via a network connection therebetween. In any of the embodiments discussed herein, filter selections may be made before or after the selection of the video-on-demand presentation. Accordingly, in some implementations where all possible filter types may not be available for a certain movie, e.g., a particularly violent movie has all possible violence filter types, but the movie has no sex or nudity therefore there are no sex or nudity filter types, only a subset of filter types may be presented to the user for activation.

The '924 application further provides various examples of content filter categories. For example, through an on-screen menu, the user may activate a strong action violence filter type and a brutal/gory violence filter type. Subsequently, during presentation of the video-on-demand movie, audio, video, or both associated with scenes having strong action violence or brutal/gory violence will be suppressed, which may involve skipping the scene entirely, blurring some or all of the movie for period of time of the scene, cropping portions of the movie to remove image portions, and/or muting some or all of the audio.

Second, the server transmits a filter metadata file to the STB (operation B) and the STB receives and stores the metadata (operation C). It is possible to transmit filters to the STB at any time. Moreover, it is also possible to transmit more than one set of filters (i.e., filter files for more than one multimedia presentation). Thus, in some instances, the STB will be configured to determine whether filters for a given movie have already been loaded into the set-top-box. With respect to transmission of the metadata filter files from the content server, the metadata transmission may be done automatically with all VOD requests. Alternatively, the metadata may be sent based upon some encoding transmitted with the initial VOD request (operation 60). For example, through the on-screen filter selection menu or a dedicated menu or menu button, the VOD request may include data or some other form of information that triggers the transmission of the filter metadata file. Although shown in FIG. 2 as coming from the server, the metadata that is sent to the STB does not necessarily come from the server. The metadata may be retrieved or transmitted directly or indirectly from removable memory, a network (e.g., Internet) connection, and other forms of data transfer. Additionally, the metadata may be transmitted to the STB any time before commencement of filtered presentation of the multimedia presentation.

In one particular implementation, the filter metadata file may include filter information as set forth in the '924 application. Generally, the filter information includes some indicia of a start time and end time of a portion of a multimedia presentation along with the type of content set forth between the start and end time. For example, between 5 minutes and 5 minutes and 20 seconds, a certain film may have strong action violence. The metadata will include information related or associated with the start time (5 minutes), the end time (5 min. 20 sec.) and strong action violence. If the user activates the strong action violence filter, when the playback reaches the 5 minute time of the movie, the next 20 seconds are suppressed. Finally, playback of the VOD movie may be filtered as a function of the user's filter settings and the metadata (operation D).

One advantage, amongst many, of the method set forth in FIG. 2 is that the filtering logic takes place on the STB side. This means that the server will send the entire multimedia content, e.g., all of the data to play the movie "Field of Dreams," and specific visual and/or audible portions of the multimedia content will be suppressed or "filtered" from the presentation on the STB side. Another advantage of the method set forth in FIG. 2 is that the entire content may be stored on the STB (e.g. on a hard-drive or a recordable optical disc). This would allow subsequent playback where the user could choose to view the entire multimedia without any filtering, or the user could view the multimedia with different filter settings. This method would also work well for a satellite transmission to a STB where the satellite is broadcasting a VOD movie to several STBs and the satellite can't provide individualized filtering for a single STB within it's footprint. These advantages as well as others set forth herein are merely set forth herein to provide some practical context for better understanding of various embodiments and are not meant to limit the scope of the invention. Various embodiments may or may not achieve the various advantages set forth herein.

Figure 3A:
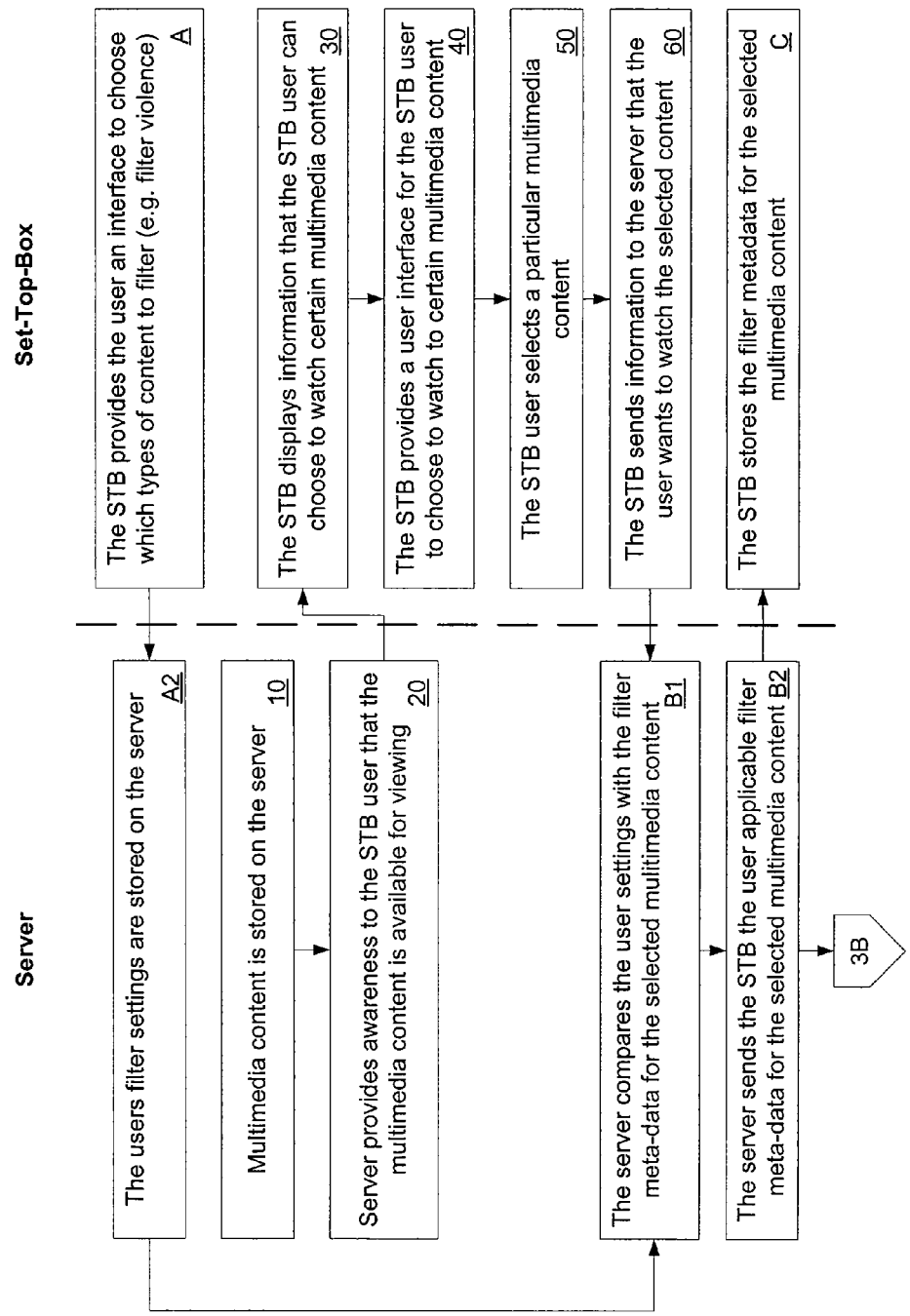
FIGS. 3A and 3B are a flowchart illustrating a third method of suppressing objectionable content from a video-on-demand presentation conforming to one particular implementation of the present invention.
Figure 3B:
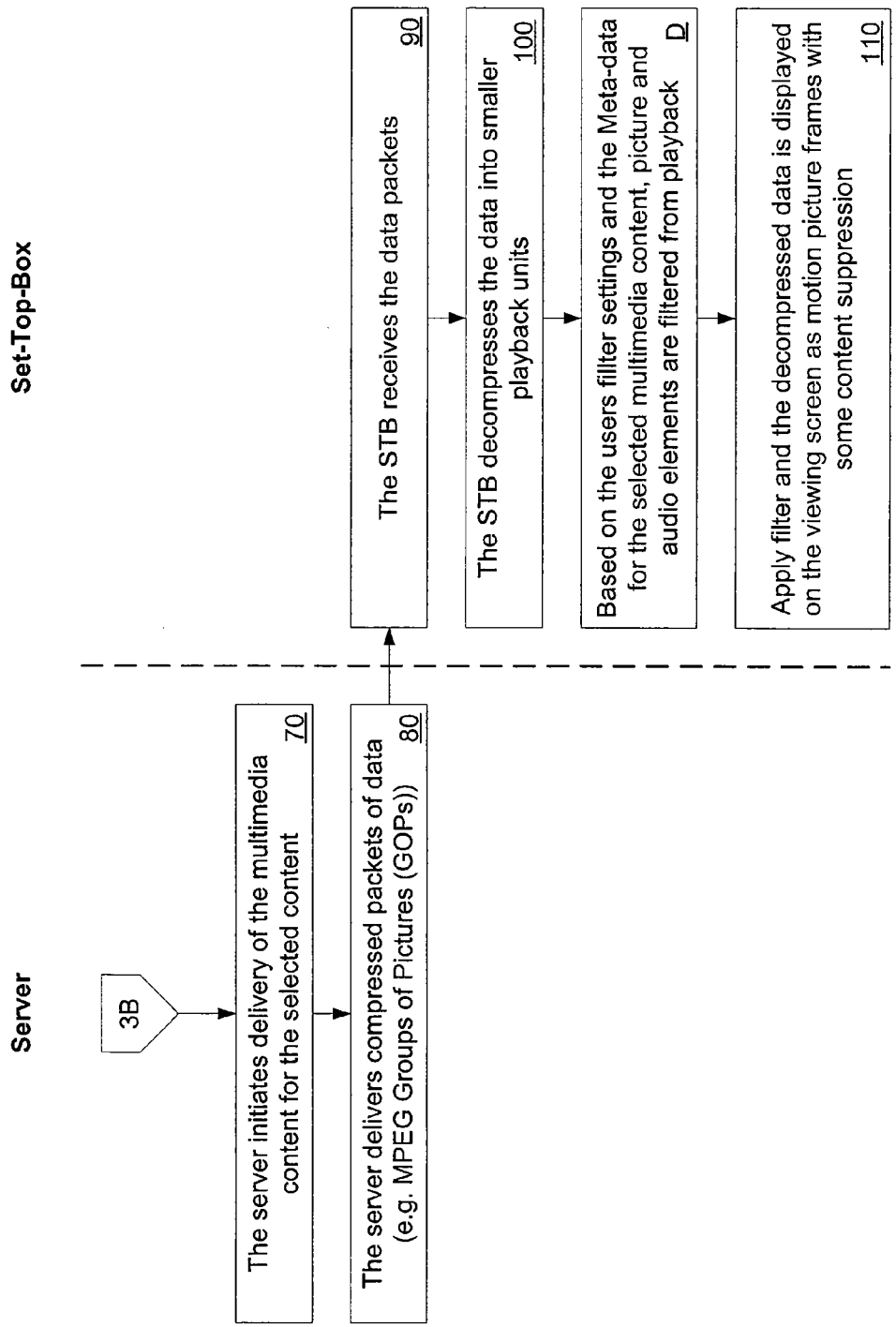

FIGS. 3A-3B are a flowchart illustrating an alternative method for facilitating filtered playback of a video on demand presentation. The operations set forth in FIGS. 3A-3B (collectively "FIG. 3") include the same operations 10-110 set forth in FIG. 1. Additionally, FIG. 3 includes operations A1-D. Like operation A in FIG. 2, through some form of input mechanism, the user may activate some or all available filter types (operation A1). The user filter activations or settings are then transmitted and stored on the server (operation A2). When the user selects a particular VOD presentation other than multimedia content, the server compares the user filter settings with filter metadata for the selected VOD presentation (operation B1). The comparison operation results in a metadata file configured to filter the selected content. Thus, unlike the method set forth in FIG. 2 that transmits all filter metadata for the selected VOD presentation, the filter metadata is a subset of all filter metadata, only including filter metadata according to the user's filter selections. The metadata file is then transmitted to the STB (operation C).

The metadata file for the method set forth in FIG. 2 includes all possible filtering options for a particular multimedia presentation. At the STB, the filter settings are applied to the metadata resulting in filtering of selected content. With the method set forth in FIG. 3, the user settings are applied to the filter metadata on the server side (operation B1). This enables the server to conform the filter metadata to the user settings before sending the filter metadata to the STB (operation B2). One advantage of this method is that the memory size of the metadata file stored in the STB (operation C, FIG. 3) is potentially smaller then if the entire filter metadata is stored on the STB (operation C, FIG. 2). Further, it may be advantageous to configure the filter metadata with the user settings on the server if the end-user has multiple STBs in their household. This way they can have the same filtered presentation on multiple STB in their household without having to enter their filter settings redundantly on each STB.

With the implementations set forth with respect to FIGS. 2 and 3, it is possible to initiate filtered playback at the STB moments after the beginning portion of the VOD file has been transferred. Depending on the bandwidth of the connection between the server and the STB, the transfer of the VOD file can be potentially faster than the playback duration of the same file.

In a first example, Movie X may have only three total filters associated with it. The three filters may each be a skip with: filter 1 having a skip with a 20 second duration, filter 2 having a skip with a 10 second duration, and filter 3 having a skip with a 15 second duration. The three filters thus have a cumulative 45 seconds of skip duration. Accordingly, the end-user could initiate playback on the STB after 45 seconds of the VOD file have been transferred from the server to the STB.

In a second example, Movie Y has a single associated filter with a skip having a 20 second duration and it starts 2 minutes into the movie. If Movie Y is one hour long, and it takes 30 minutes to transfer the entire file for Movie Y from the server to the STB, the user could potentially start filtered playback of Movie Y concurrently with the initiation of the transfer of the VOD file from the server to the STB—if the file transfer rate was fast enough that by the time the viewer was 2 minutes into the movie the transfer of the movie file was at least 20 seconds ahead of the playback time.

For any of the methods set forth herein, various possible alternative methods may be achieved by combining various operations from the various methods set forth herein. For example, operations A1 and A2 of the method set forth in FIG. 3 may be applied to the method set forth in FIG. 2. In other words it would be possible for the user filter settings to be stored on the server side in the method of FIG. 2.

Figure 4A:
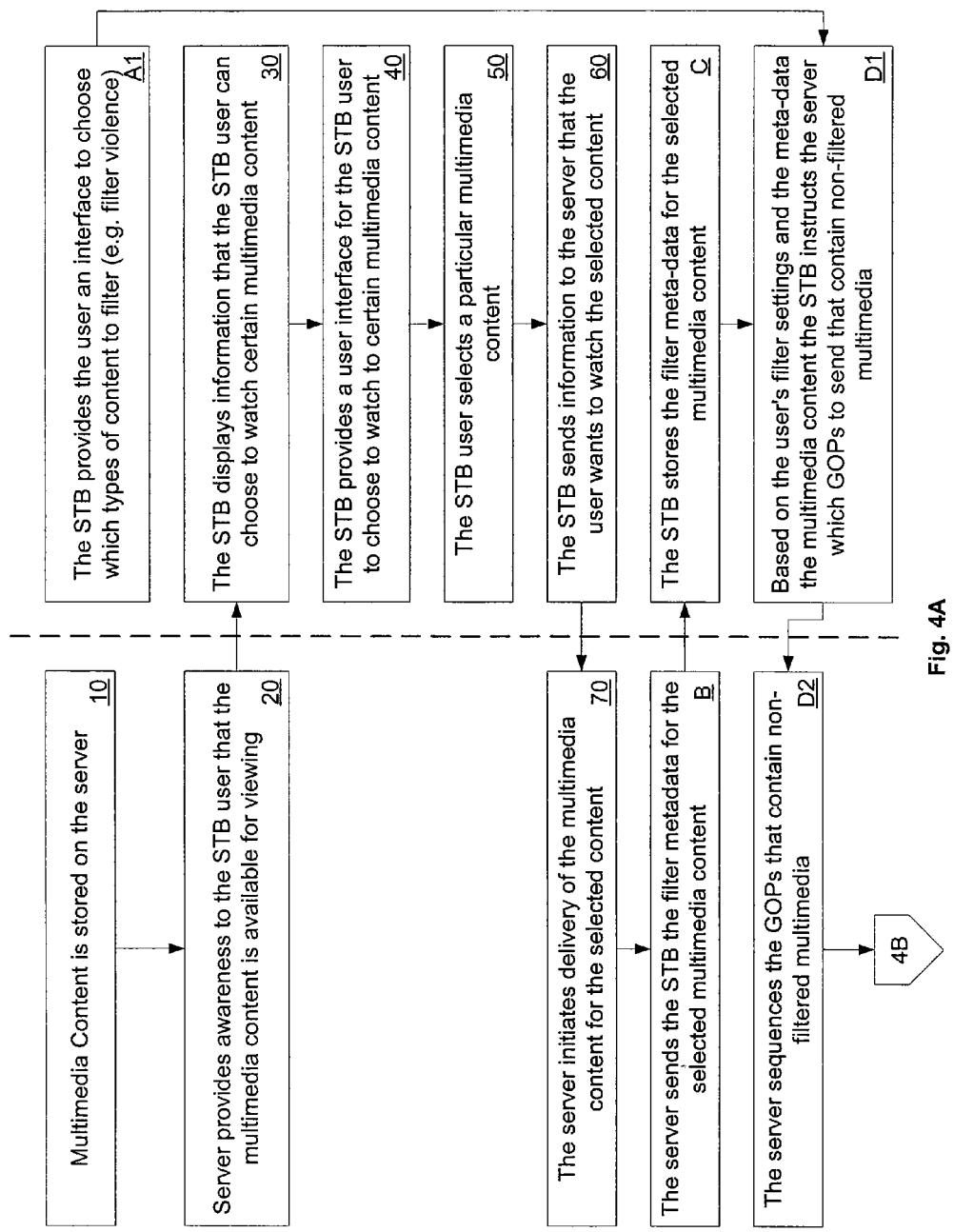
FIGS. 4A and 4B are a flowchart illustrating a fourth method of suppressing objectionable content from a video-on-demand presentation conforming to one particular implementation of the present invention.
Figure 4B:
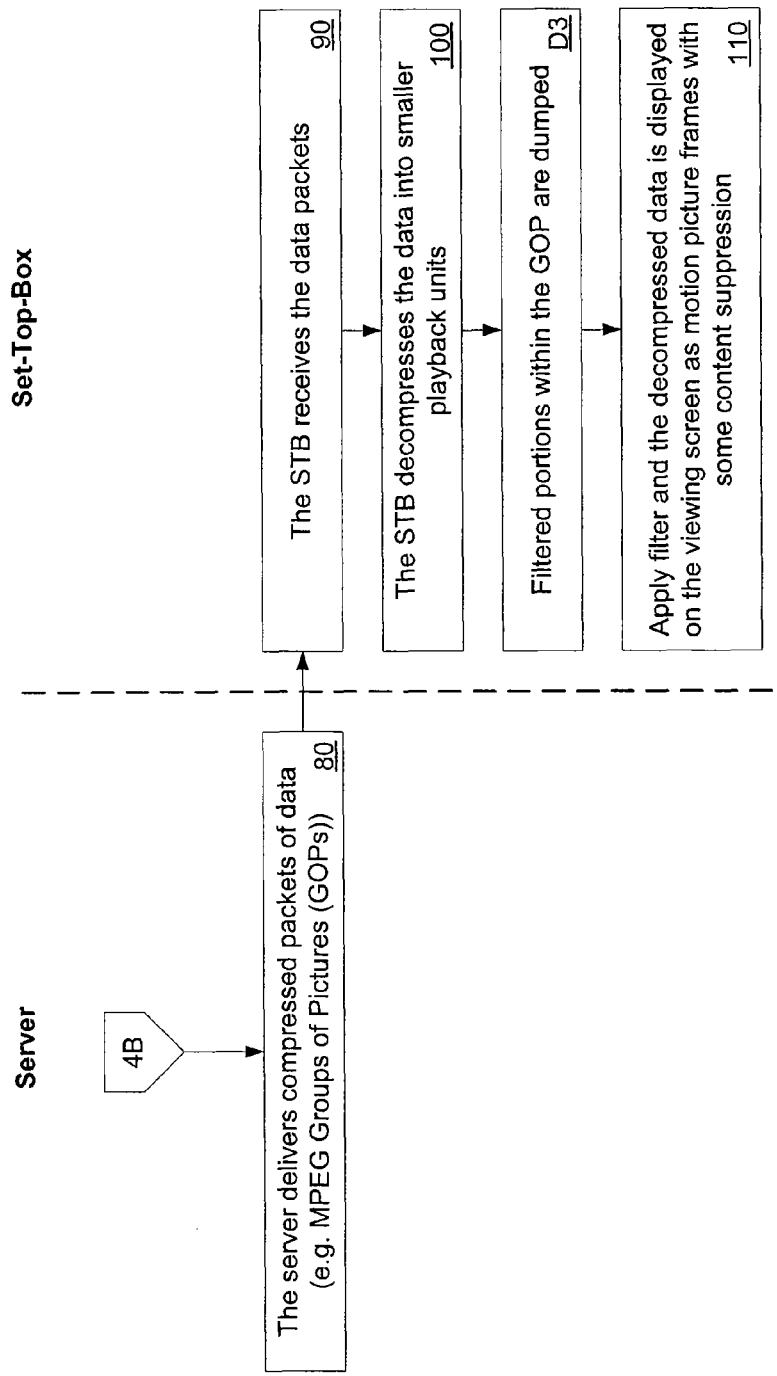

FIGS. 4A-4B are a flowchart illustrating an alternative method for facilitating filtered playback of a VOD presentation. The operations set forth in FIGS. 4A-4B (collectively "FIG. 4") include the same operations 10-110 set forth in FIG. 1. Additionally, FIG. 4 includes operations A1-D3. Like operation A in FIG. 2, through some form of input mechanism, the user may activate some or all available filter types (operation A1). Similar to the method set forth in FIG. 2, the server transmits a filter metadata file to the STB (operation B) and the STB receives and stores the metadata (operation C).

At the STB, the filter settings are compared with the metadata for a selected VOD presentation. The STB then instructs the server to only send multimedia data corresponding to non-filtered multimedia data. Stated another way, the STB requests a stream of multimedia data from the server that pre-suppresses some or all content associated with activated filters. Thus, for example, the VOD data from the server will not contain most or all portions of scenes with strong action violence (if activated).

In the particular implementation of FIG. 4, some of the multimedia content is filtered on the server side (i.e. never gets sent to the STB). However, the server sends data, i.e., picture information, that is going to be filtered by the STB because often the smallest unit of multimedia data is an MPEG Group of Pictures (GOP) and a single GOP can contain multimedia content that is both filtered and non-filtered during presentation from the STB. Thus, in operation D2, the server sequences GOPs containing non-filtered data. The GOPs may, however, include some portions of content intended for filtering. The sequence of GOPs are transmitted to the STB, which receives and decompresses the data into smaller playback units (operations 80-100). The STB then analyzes the smaller playback units for filtered content and eliminates the remaining data associated with the filtered content. Because of the nature of motion compression, some of the multimedia data that gets filtered is required by the MPEG decoder on the STB to generate some of the non-filtered multimedia data.

Figure 5:
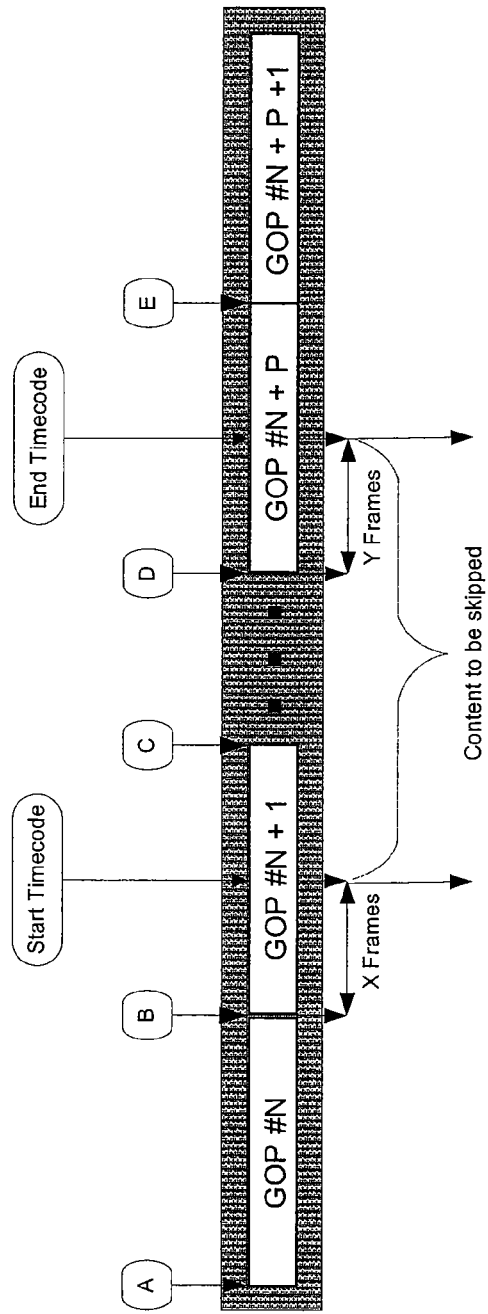
FIG. 5 is a diagram illustrating a portion of MPEG encoded data and illustrating content suppression related thereto in conformance with one particular implementation of the present invention.

FIG. 5 is an example of a sequence of MPEG Group of Picture packets and of associated filter start and end time coding and other information. The content between the start and end time code, in this example, is intended to be skipped (not shown), a form of suppression. The start time code falls within GOP#N+1 and the end time code falls within GOP#N+P. With reference to FIG. 5 and in relation to operations D1-D3, the server would deliver [GOP #N] and [GOP #N+1] and [GOP #N+P] and [GOP #N+P+1] to the STB. The server would not deliver any packets between [GOP #N+1] and [GOP #N+P] (i.e. the server would not deliver [GOP #N+2], [GOP #N+3], [GOP #N+4], etc.). At the STB, during the decoding process, when the STB decoded [GOP #N+1] it would drop all multimedia data that came after "X-Frames". During the decoding process, when the STB decoded [GOP #N+P] it would drop all multimedia data labeled as "Y-Frames".

Figure 6:
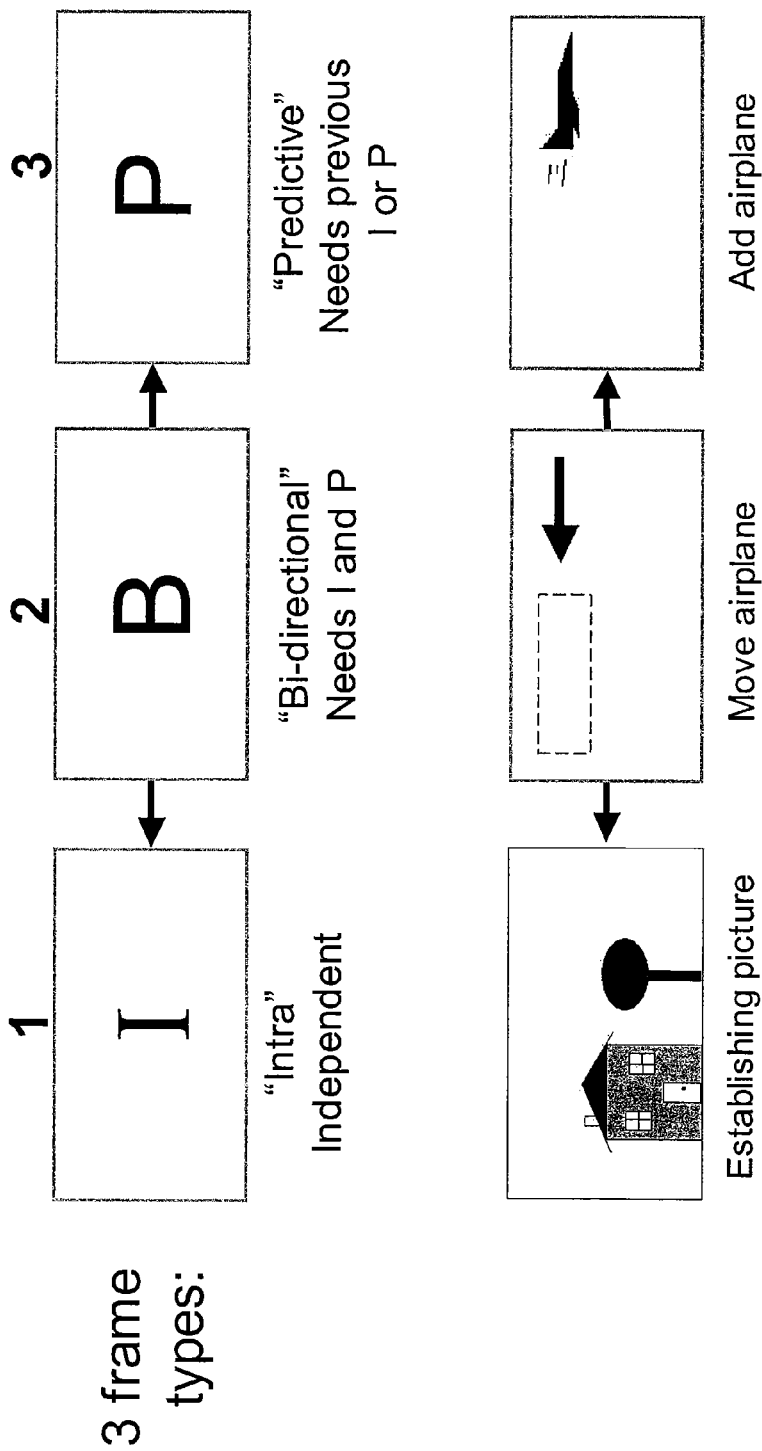
FIG. 6 is a diagram illustrating the relationship between certain types of MPEG encoded frames.

The STB may still require the presence of some of the "Y-Frames" data to generate the frames that occur after the "Y-Frames". For example, in the MPEG frame sequence set forth in FIG. 6, the "B-Frame" requires both the "I-Frame" and the "P-Frame" to generate the "B-Frame". So if the I-Frame is filtered from playback and the B and P frames are not filtered from playback, the STB still needs the I-frame from the server to be able to generate both the B and P frames.

Figure 7A:
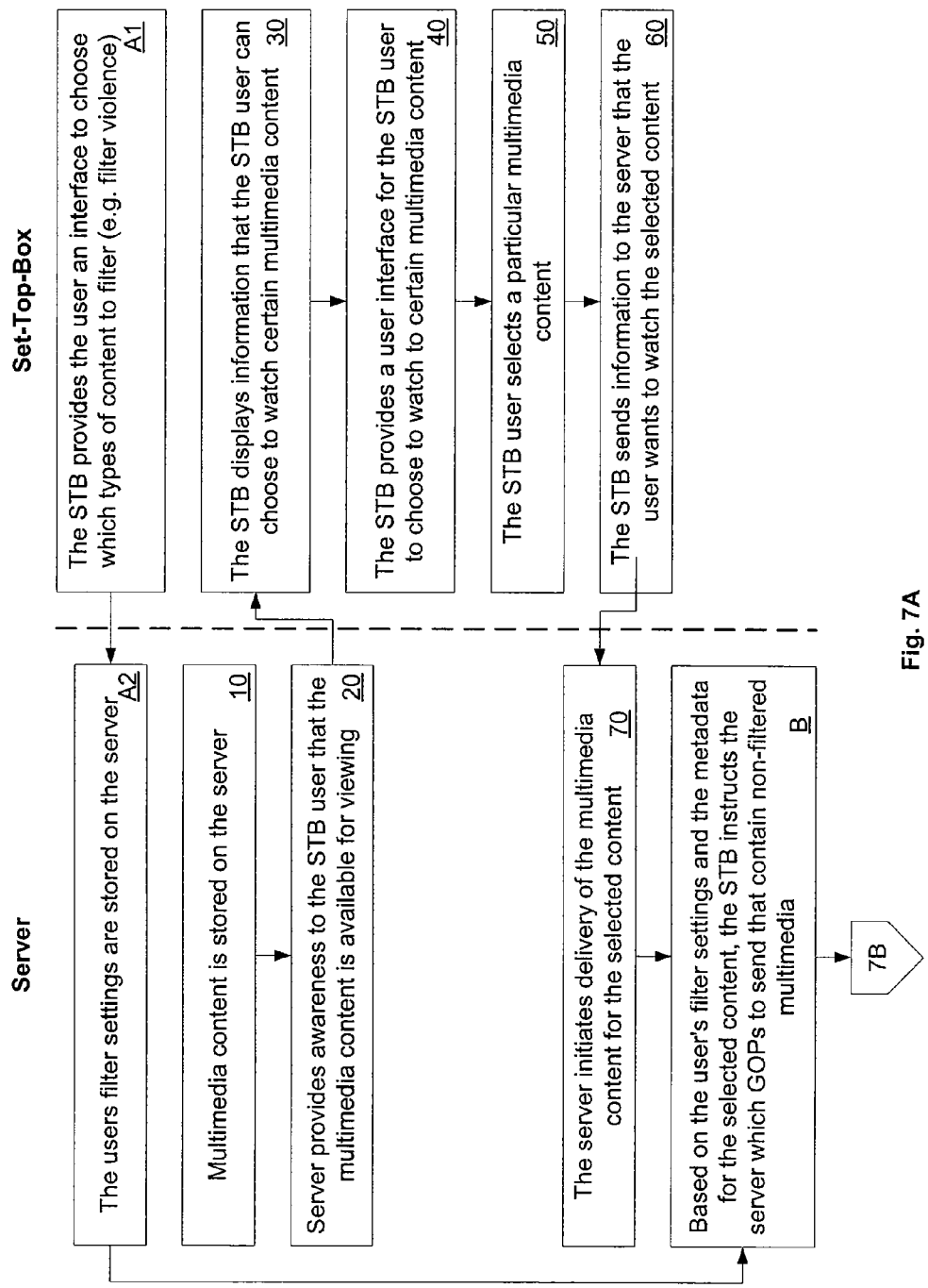
FIGS. 7A and 7B are a flowchart illustrating a fifth method of suppressing objectionable content from a video-on-demand presentation conforming to one particular implementation of the present invention.
Figure 7B:
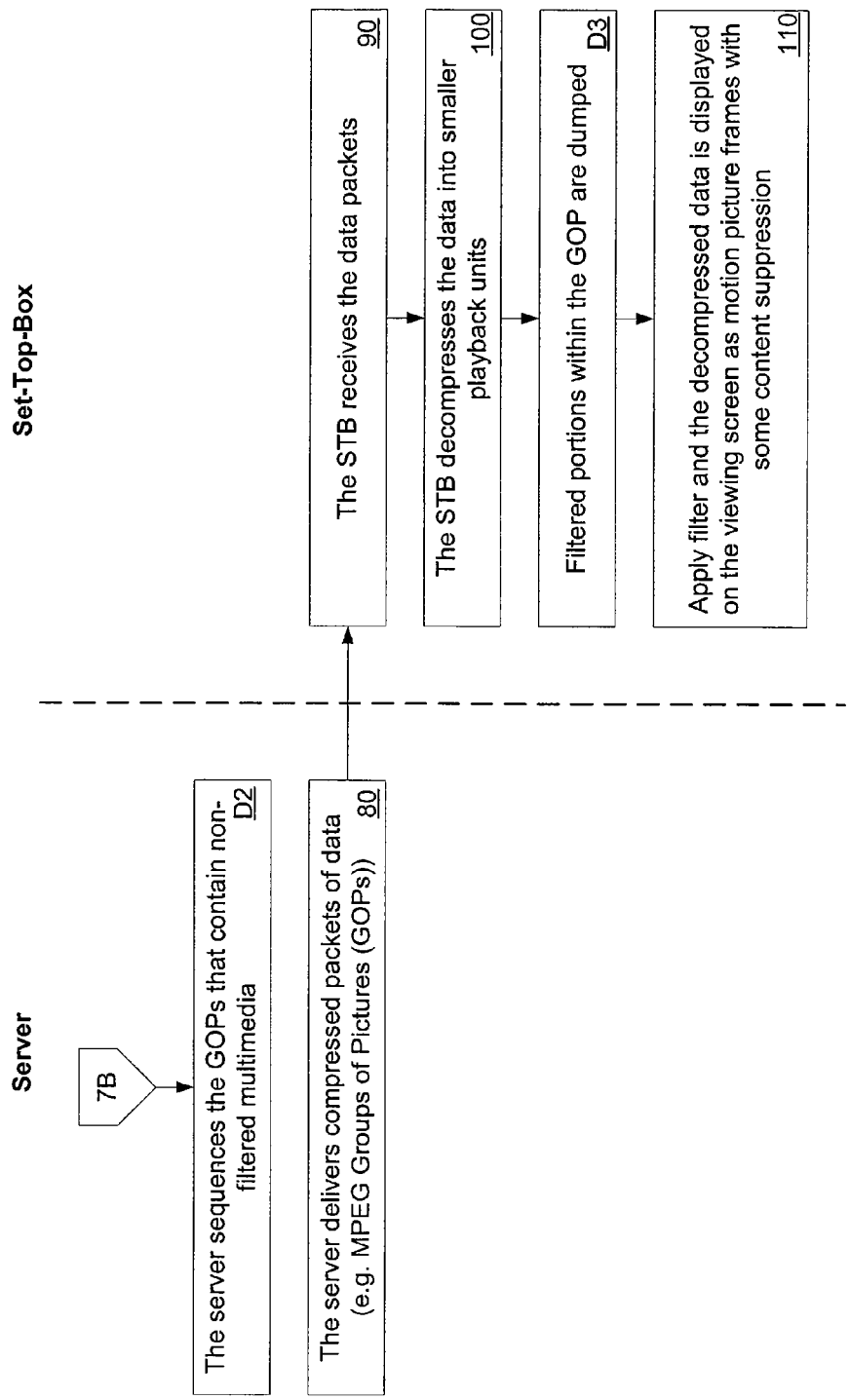

FIGS. 7A-7B are a flowchart illustrating an alternative method for facilitating filtered playback of a video on demand presentation. As with some earlier described methods, the operations set forth in FIGS. 7A-7B (collectively "FIG. 7") include the same operations 10-110 set forth in FIG. 1. Additionally, FIG. 7 includes operations A1-D3. Through some form of input mechanism (as described above), the user may activate some or all available filter types (operation A1). The user filter activations or settings are then transmitted and stored on the server (operation A2). The method set forth in FIG. 7 does not send filter metadata to the STB. Rather, the user settings and the filter metadata are conformed on the server side (operation B), and the GOPs are sequenced on the server side (operation D2). The GOP sequence is then transmitted to the STB, where it is received and decompressed into smaller playback units (operations 80-100). Then, like described above, the STB parses the filtered portions of a GOP from the non-filtered portions of a GOP (operation D3). This can be done by imbedding or associating the start location of the non-filtered portions of the GOP in the GOP.

Referring again to FIG. 5, for example, if X-Frames=5 and Y-Frames=9, then:

When [GOP #N+1] is sent to the STB it could be associated with the value 5. This would indicate to the STB that only the first 5 frames should be displayed in the presentation.

When [GOP #N+P] is sent to the STB it would be associated with the value 9. This would indicate to the STB that the first 9 frames should not be displayed in the presentation.

There are many ways to indicate to the STB which frames of a GOP should ultimately be displayed during the presentation. The above example is simply to show that only a single numeric value needs to be associated with the GOPs that contain both multimedia portions that should be filtered and multimedia portions should not be filtered.

Figure 8A:
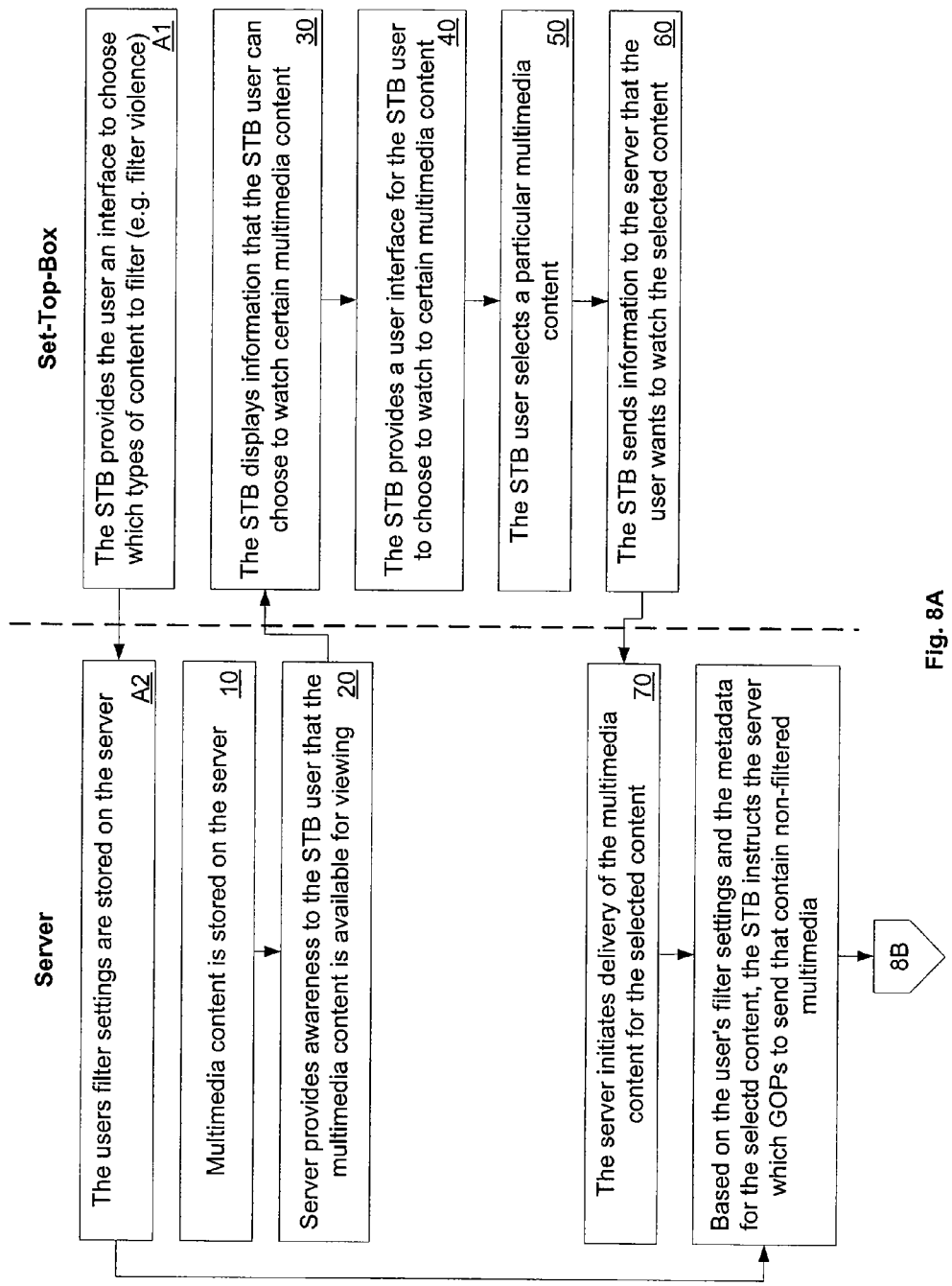
FIGS. 8A and 8B are a flowchart illustrating a sixth method of suppressing objectionable content from a video-on-demand presentation conforming to one particular implementation of the present invention.
Figure 8B:
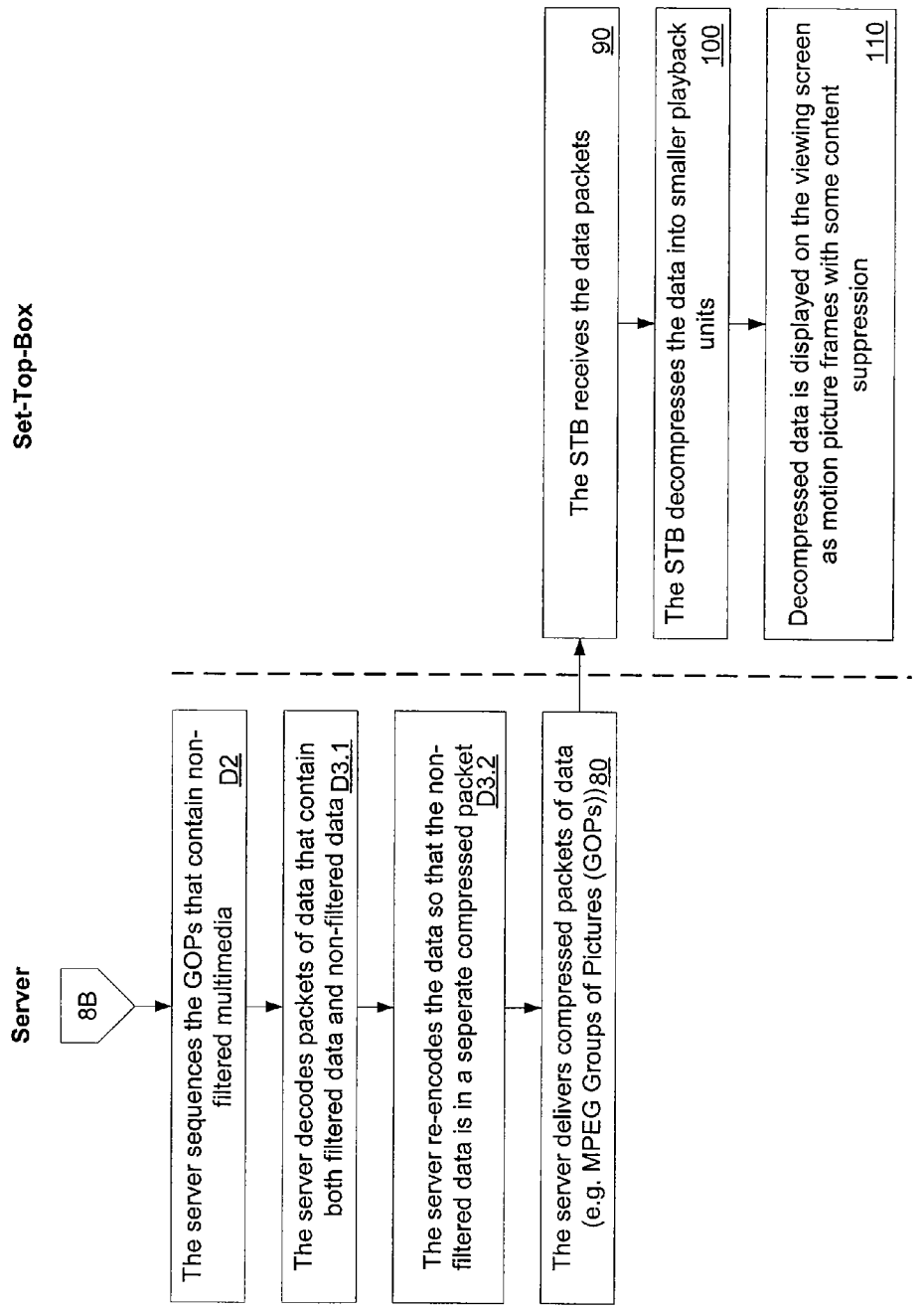

FIGS. 8A-8B are a flowchart illustrating an alternative method for facilitating filtered playback of a VOD presentation. As with some earlier described methods, the operations set forth in FIGS. 8A-8B (collectively "FIG. 8") include the same operations 10-110 set forth in FIG. 1. Additionally, FIG. 8 includes operations A1-D3.2. Through some form of input mechanism (as described above), the user may activate some or all available filter types (operation A1). The user filter activations or settings are then transmitted and stored on the server (operation A2). The method set forth in FIG. 8, like FIG. 7, does not send filter metadata to the STB. Rather, the user settings and the filter metadata are conformed on the server side (operation B), and the GOPs are sequenced on the server side (operation D2).

Unlike the method set forth in FIG. 7, the server only sends non-filtered portions of the multimedia content to the STB. This is done by decoding the GOPs that have both filtered portions of multimedia and non-filtered portions of multimedia (Step D3.1) and then re-encoding the data so that the new compressed multimedia packet only contains non-filtered multimedia data (Step D3.2). It is also possible at the time of the original compression of the multimedia content to make sure that the content is compressed in a manner that is compatible with filtering. In other words, at the time of authoring, the authoring process would take the filtering metadata into consideration and make sure that affected portions of the multimedia that can be filtered are already broken into packets that can be sequenced so that filtered content is never sent to the STB. The encoded and completely filtered presentation data is then transmitted to the STB (operation 80). One advantage of this method is that all the filtering logic can take place on the server side.

In one implementation, filter metadata includes a filter table of individual filters for a particular multimedia presentation. Each filter includes an identification of a portion of a multimedia presentation and a corresponding filtering action. The filtering action, as mentioned above, involves some form of content suppression, whether skipping, blurring, cropping, and/or muting portions of the multimedia presentations. The portion of the multimedia presentation subject to suppression may be identified by a start and end time code, by a time or location and an offset value, and through other multimedia relative identification means that provide for accurate identification of some discrete portion of a multimedia presentation. Table 1 below provides two examples of filters for the movie "Gladiator". The filter metadata for any particular multimedia presentation may include any number of discrete filters, filter types, and may be for one particular title or a plurality of titles.

TABLE 1

Filter Metadata with example of two Filters for the Film Gladiator

| Filter | Start | End | Duration | Filter Action | Filter Codes |
|---|---|---|---|---|---|
| 1 | 00:04:15:19 | 00:04:48:26 | 997 | Skip | 2: V-D-D, V-D-G |
| 2 | 00:04:51:26 | 00:04:58:26 | 210 | Skip | 1: V-D-G |

Referring to Table 1, the first filter (1) has a start time of 00:04:15:19 (hour:minute:second:frame) and an end time of 00:04:48:26. The first filter further has a duration of 997 frames and is a "skip" type filtering action (as opposed to a mute or other type of suppression). Finally, the first filter is associated with two filter types. The first filter type is identified as "V-D-D", which is a filter code for a violent (V) scene in which a dead (D) or decomposed (D) body is shown. The second filter type is identified as "V-D-G", which is a filter code for a violent (V) scene associated with disturbing (D) and/or gruesome (G) imagery and/or dialogue. Implementations of the present invention may include numerous other filter types. During filtered playback of the film "Gladiator," if the "V-D-D", "V-D-G", or both filters are activated, the 997 frames falling between 00:04:15:19 and 00:04:48:26 are skipped (not shown). Additionally, if the V-D-G filter file is activated, the 210 frames falling between 00:04:51:26 and 00:04:58:26 are skipped.

For proper filtering of a multimedia presentation, the filter time code information should be synchronized or otherwise related with the proper portion of the multimedia presentation. For example, if the filter time code information was established in a DVD multimedia environment with a known and repeatable start of the multimedia presentation, the start and end time code may be reliably based on the start of the multimedia presentation. Moreover, DVD provides time codes within the multimedia data. Thus, a filter start time of 04:15:19 relates to 4 minutes, 15 seconds, and 19 frames from the start of the multimedia presentation. A VOD presentation of the same multimedia presentation, however, may not have the same start time. For example, the VOD presentation may include commercials, movie trailers, and any number of other possible forms of multimedia that precede the primary multimedia presentation. Moreover, different VOD presentations may include different preceding multimedia. In such situations, the start of the primary multimedia presentation would be at some time after the start of the VOD presentation. Moreover, the start of the primary multimedia presentation may vary, depending on the VOD provider and other factors. In such a situation, it may be necessary to synchronize the metadata timing information with the multimedia presentation so that the filter actions are applied to the appropriate portion of the multimedia.

Figure 9:
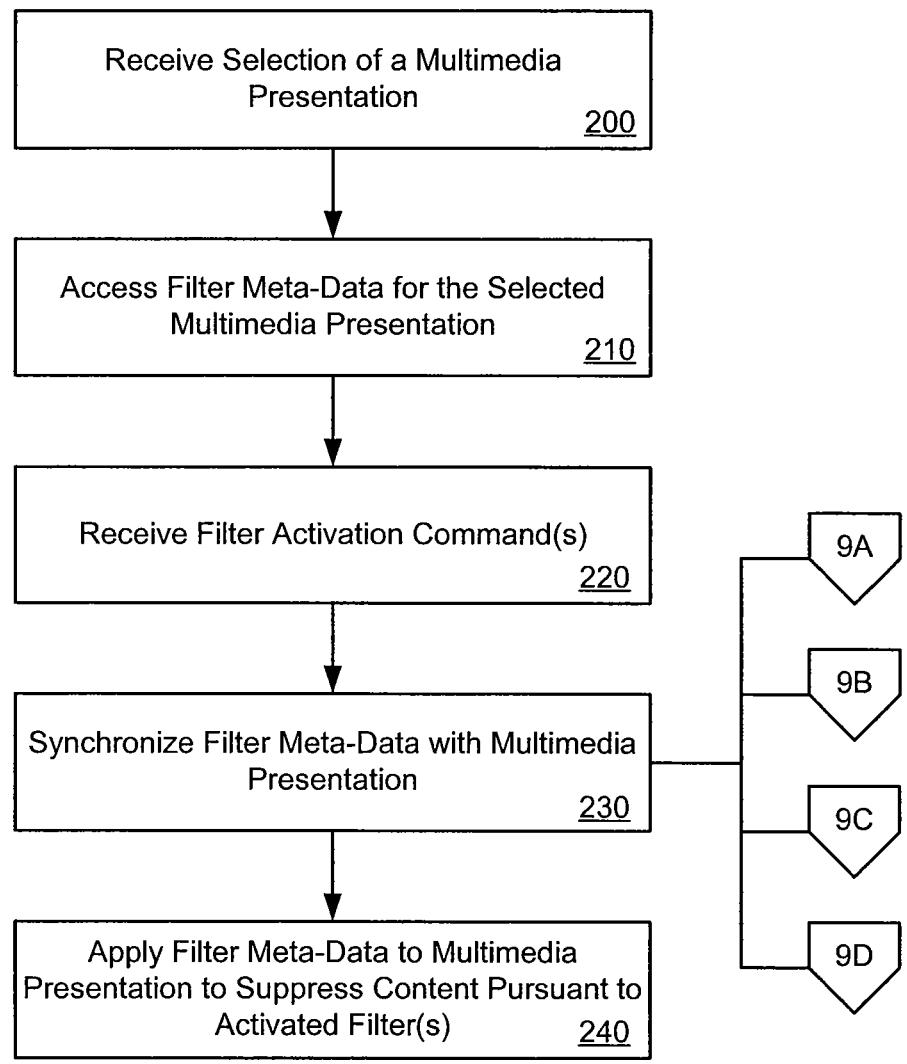
FIGS. 9-9D illustrate various method for synchronization of content suppression filters and a multimedia presentation conforming to various implementations of the present invention.

FIG. 9 is a flowchart illustrating an overall method of filtering a VOD or other multimedia presentation that involves synchronization of multimedia data with the multimedia presentation. First, a user selects a multimedia presentation for presentation on a presentation device, such as a set-top box accessing multimedia from cable or satellite sources (operation 200). With respect to a VOD presentation, the user may access an on-screen menu and select one or a plurality of possible VODs. Second, as discussed with respect to various implementation above with regard to FIGS. 1-8, the presentation device accesses filter metadata for the selected multimedia presentation (operation 210). Third, the user activates one or more of various possible filter types to apply to the multimedia presentation during presentation (operation 220). During presentation, the filter metadata is synchronized with the multimedia presentation so that any suppression actions defined by particular filters are applied to the appropriate portion of the multimedia presentation (operations 230 and 240). FIGS. 9A-9D provide some examples of methods for synchronizing the filter metadata, in accordance with aspects of the invention.

Generally speaking, in a VOD environment or other environment it is possible to provide a discrete multimedia presentation file with a known starting point. In such a situation, filtering based on relative time (filters such as shown in Table 1 above with start and end time information) may be employed. As such, synchronization may involve identifying the start of the VOD presentation and timing the presentation from that point forward. Since the start time is known and repeatable, synchronization involves identifying the beginning of the VOD, pay-per-view, or other multimedia presentation.

Figure 9A:
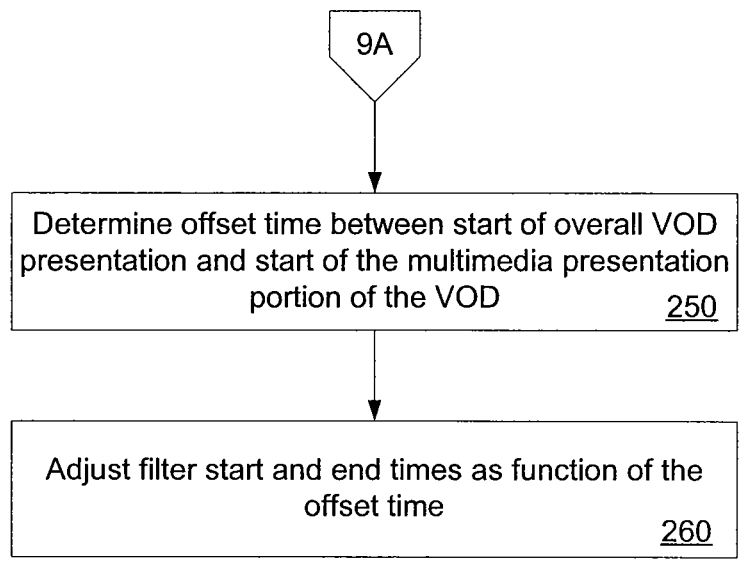

In one particular implementation, synchronization is achieved by adjusting the start and end time values according to a relative time offset between the start of the overall VOD presentation and the start of the multimedia presentation portion of the VOD presentation. FIG. 9A provides one example of a method for adjusting the filter start and end times in order to synchronize the filter metadata with a VOD presentation. First, an offset time between the start of an overall VOD presentation (e.g., the start of the VOD data feed, which may include trailers, etc.) and the multimedia content portion (e.g., the start of the actual movie) is determined (operation 250). For example, if the primary multimedia presentation begins 5 minutes after the start of the VOD presentation, then the relative time offset is 5 minutes. The start and end time codes may then be adjusted from the offset time (operation 260). Thus, the start and end time codes for each filter may be adjusted by 5 minutes. Referring again to table 1, for filter 1, the start time is adjusted as 00:04:15:19 (base start time)+00:05:00:00 (offset)=00:09:15:19 (adjusted start time), and the end time is adjusted as 00:04:48:26 (base end time)+00:05:00:00 (offset)=00:09:48:26 (adjusted end time). The timing offset value may be determined in any number of ways. In one implementation, the preceding VOD multimedia is analyzed to determine its time length. The analysis may include analyzing a software module to count MPEG frames, assessing integrated timing information, running a timer against the multimedia and other possible means for assessing the timing offset. The time is then converted to an offset value and applied to the filter metadata. In another implementation, the VOD provider may provide the offset information, which is applied to the filter metadata. For example, the VOD provider may transmit the offset identifier to the STB along with the filter metadata, and the STB may then filter time entry by the offset.

Figure 9B:
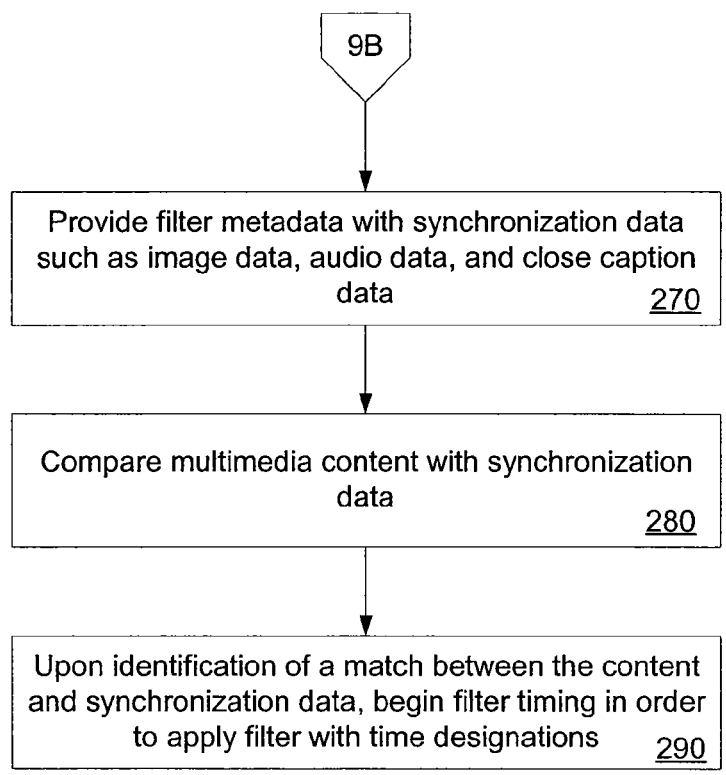

In a second implementation, the filter metadata may include synchronization data that is used to synchronize the metadata with the multimedia presentation. FIG. 9B provides one example of a method for synchronizing filter metadata with a VOD presentation by embedding unique non-time based identifiers into the metadata and comparing it to attributes of the VOD presentation. The synchronization data may involve any unique and detectable aspect of the multimedia presentation. For example, the synchronization data may involve image data, audio data, and extended data services, such as close captioning data, associated with the beginning or some other known portion of the multimedia presentation from which the relative location of discrete portions of the multimedia presentation may be accurately identified (operation 270). The synchronization data may involve one unique attribute or combinations of unique attributes. For example, synchronization data may involve only image data or may be a combination of image data and audio data, audio data and close captioning data, etc. Further, the synchronization data may involve the start of the multimedia presentation, may involve data related to certain portions of the multimedia presentation, or some combination thereof. Further synchronization data may be provided to account for interruptions in the multimedia presentation, such as commercials.

First, with respect to image synchronization data, the metadata may include a copy of the image data for the first frame or frames (synchronization frame) of the multimedia presentation or some other portion of the multimedia presentation or a copy of some portion of the first frame of the multimedia presentation. At the start of the video on demand presentation, each actual frame is compared to the synchronization frame (operation 280). The same comparison operation may occur with other forms of synchronization data (e.g., audio and close caption). When a match is detected, the filter application may begin a timer or otherwise track the time of the multimedia presentation for purposes of comparing the time of the multimedia presentation with the start time codes of the activated filters (operation 290). As such, the VOD presentation may be synchronized with the metadata. When there is a match between the time of the multimedia presentation and the start time code of an activated filter, then the appropriate filtering action occurs, e.g., skip, mute, crop, etc. (operation 240, FIG. 9).

The image data used for comparison may take on various forms. In one implementation, the metadata image synchronization data involves some or all of an uncompressed image frame. A frame of uncompressed video data may include a set of pixels arranged by row and column. The metadata image synchronization may include some or all of the pixel information for a certain frame. For example, the image synchronization may involve select pixels in a frame, an entire row of image data, or all pixels for a certain frame. Unique frames of video may be identified with reference to the vertical blanking interval (VBI). The VBI is provided at the boundary between frames of image and audio data; thus, a new frame follows the VBI. As such, after detection of the VBI, appropriate pixels in a frame are compared to the image synchronization data to synchronize the metadata with the multimedia presentation.

In another implementation, the metadata image synchronization involves compressed or encoded image data. For example, the metadata image synchronization may involve MPEG encoded data. The encoded image synchronization is then compared with the multimedia presentation at a point before it is decoded for display. Some multimedia is received at a set-top box or other presentation device in an encoded digital form. For display, the presentation device decodes the multimedia, and in some instances converts video and audio to analog form in order for display and sound presentation. The image synchronization data may then be defined for comparison against the multimedia at a different point in the processing flow necessary for its presentation.

With uncompressed image synchronization data, to synchronize the metadata with the multimedia presentation, the multimedia presentation is compared with the metadata image synchronization information after the multimedia is decoded or uncompressed. Because some forms of decompression or decoding may involve some alteration of the original multimedia data, typically referred to as "lossy," the comparison does not require an exact match. In a simple example, if the image synchronization data is one pixel of information with a value of [R=100, B=100, G=100], then a positive match may include a deviation from any or all values that accounts for possible alterations in the original multimedia after decoding or decompression. Thus, a match might be valid with a pixel having a value of [R=100±2, B=100±2, and G=100±2].

Second, with respect to audio synchronization data, the metadata may include a copy of the audio data for the first frame or other frames of the (synchronization audio) of the multimedia presentation or a copy or other representation of some portion of the audio for the first frame or frames of the multimedia presentation. At the start of the video on demand presentation, the audio is compared to the synchronization audio (operation 280). When a match is detected, the filter application may begin a timer or otherwise track the time of the multimedia presentation for purposes of comparing the time of the multimedia presentation with the start time codes of the activated filters (operation 290). As such, the VOD presentation may be synchronized with the metadata. When there is a match between the time of the multimedia presentation and the start time code of an activated filter, then the appropriate filtering action occurs, e.g., skip, mute, crop, etc. (operation 240, (FIG. 9).

As with image data, audio synchronization data may involve uncompressed, compressed and coded digital audio information, or analog audio information. For synchronization with uncompressed digitized audio, metadata audio synchronization data may involve a series of digitized audio amplitudes that are compared to the actual uncompressed digital audio data of the multimedia presentation. For synchronization with compressed or encoded audio, metadata audio synchronization data may involve some portion of the encoded audio for the multimedia presentation. Audio encoding may include MP3 formats, MPEG format, etc. Thus, the metadata audio synchronization data would include some portion of the MP3, MPEG, etc., audio data that can be compared with the encoded audio for the multimedia presentation.

Further, for synchronization with compressed or encoded audio, metadata audio synchronization data may involve some representation of the encoded audio for the multimedia presentation. Audio may be digitized with various sampling rates, depending on various factors. For example, some audio is digitized at a sampling rate of 44.1 KHz. It is possible to "down sample" the audio data to some lesser sampling rate, such as about 8.0 Khz. For comparison against down-sampled audio data, the metadata audio synchronization data includes down-sampled audio data. It is possible that metadata audio synchronization data may be developed for application against multimedia audio data in its original form. For comparison against audio data in a down-sampled form, the metadata synchronization data is appropriately down-sampled as well. Due to the relatively larger file sizes of the original audio data files, it may be more efficient to down-sample the audio portion of a multimedia presentation for metadata synchronization.

The synchronization audio data may also be a function of the intensity or energy of the digital audio signal. FIG. 10 is a graph of audio data for a portion of the audio of a multimedia presentation. The graph plots three different representations of audio data from a multimedia presentation. First, the graph includes raw digitized audio data 300 sampled at 8.0 Khz. The graph further includes a graph of the energy of the audio data (310). Finally, the graph includes an energy threshold graph (320).

In one example, the energy of the audio signal may be a function of a running average of discrete digital audio values. For example, a first energy value may equal the sum of the first 255 bytes of audio divided by 256, the second energy value=sum of byte 1 through byte 256 divided by 256, and so on. The audio synchronization data may thus include audio energy values or a group of audio energy values. Further, audio energy may be compared with a threshold value to create the energy threshold graph. For example, digitized energy values, represented for example as a one byte value, may be compared to a threshold value. In one example, the threshold value is 500. The energy threshold graph has a default value of 0. An energy value meeting or exceeding the threshold value, changes the state of the energy threshold value, say to 4000 or some other value. When the energy falls below the threshold for some period, the energy threshold graph returns to 0. In one example, when the energy source has a decreasing gradient of 0.75 (−0.75) for 20 samples, then the energy threshold graph returns to 0.

In implementations, audio synchronization data may be tailored for comparison against any of the audio data representations set forth in FIG. 10, alone or in combination, as well numerous other possible audio representations. For example, audio synchronization data may include one or a plurality of digitized audio samples, such as 20 consecutive digital audio values. For synchronization, such audio synchronization data would be compared to the sampled audio data. In another example, the audio synchronization data would include a plurality of consecutive audio energy values that is compared with the energy of the multimedia audio signal in order to synchronize the metadata with the multimedia presentation. Finally, in another example, audio synchronization data includes some form of energy threshold data, such as a pattern of exceeded thresholds that is compared with a running threshold graph of the multimedia audio.

Third, with respect to close captioning synchronization data, the metadata may include a copy of some portion of the close captioning text (operation 270). The close captioning may conform to the XDS standard. It is also possible to employ other types extended data services data, close captioning data is but one example. The close captioning data may be embedded in the vertical blanking interval (VBI) or provided elsewhere, such as in a digital television environment. In a digital television environment, close captioning and other data that could be used in synchronization may conform to the EIA-708, Program and System Information Protocol, and other relevant protocols and standards. At the start of the video-on-demand presentation, the actual close captioning is compared to the synchronization close captioning data (operation 280). When a match is detected, the filter application may begin a timer or otherwise track the time of the multimedia presentation, for purposes of comparing the time of the multimedia presentation with the start time codes of the activated filters (operation 290). As such, the video on demand presentation may be synchronized with the metadata. When there is a match between the time of the multimedia presentation and the start time code of an activated filter, then the appropriate filtering action occurs, e.g., skip, mute, crop, etc.

Other metadata audio forms and close caption analysis forms that may be used for synchronization and methods of comparison that may be readily adapted to synchronization are described in U.S. application Ser. No. 10/927,769 titled "Method and Apparatus for Controlling Play of an Audio Signal," filed on Aug. 26, 2004 (Pub. No. US 2005/0086705), which is hereby incorporated by reference herein. With respect to the various forms of synchronization data, e.g., video, audio, or close captioning, it is not necessary that the synchronization data be related to the first frame of the multimedia presentation or the beginning of the multimedia presentation. For example, as discussed in more detail with respect to a third implementation, synchronization may occur at a point with a known relation to a filter event. Further, various synchronization data forms may be combined to define a unique synchronization data set or signature that may be readily compared with the multimedia presentation.

Figure 9C:
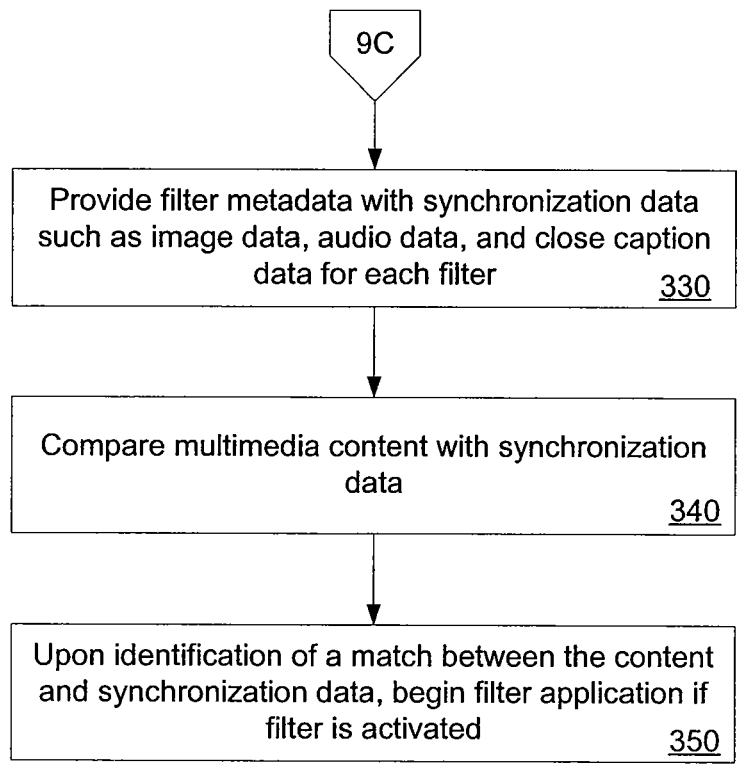
Figure 9D:
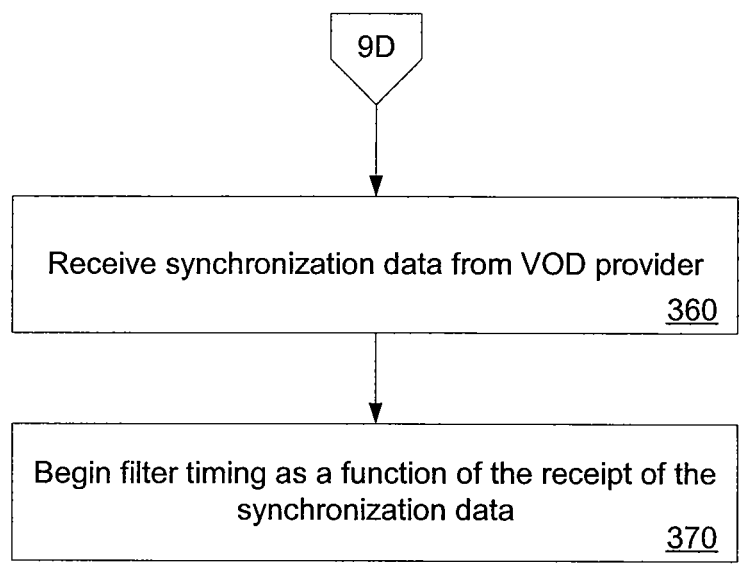

In a third implementation, FIG. 9C provides an example of a synchronization method where synchronization data is part of the filter metadata and also replaces the filter metadata start and end time codes. Thus, rather than time code information, the filter metadata includes a start and end identifier that may take on the various synchronization data types set forth above, as well as others (operation 330). Examples of start and end identifiers include image data, audio data, close captioning data, XDS information, data packets or any other information or data associated with a specific location in the multimedia presentation. The start and end identifiers, in one particular implementation, may replace the start and end time code information of the metadata type discussed above. As such, the start and end identifiers are associated with the start and end of some portion of a multimedia presentation. Table 2 set forth below illustrates examples of two filters that employ video image data as start and end filter identifiers.

TABLE 2

Filter Metadata with example of two Filters for the Film Gladiator

| Filter | Start Identifier | End Identifier | Duration | Filter Action | Filter Codes |
|---|---|---|---|---|---|
| 1 | Video Frame 1000 image data | Video Frame 1997 image data | 997 | Skip | 2: V-D-D, V-D-G |
| 2 | Video Frame 3000 image data | Video Frame 3210 image data | 210 | Skip | 1: V-D-G |

Filter 1 includes a start identifier of Video Frame 1000 image data and an end identifier of Video Frame 1997 image data. Thus, the start identifier includes some or all of the image data for frame 1000 and the end identifier includes some or all of the image data for frame 1997. The filter further indicates that the duration of the skip action is 997 frames. If either the V-D-D or V-D-G type filters are activated, then during play of the multimedia presentation, the filter application compares the image data that has been decoded and is queued for display against the start identifier image data (operation 340). When a match is detected, the filter application directs the video on demand player to not display frames 1000 through 1997 (operation 350). Display may begin again by either comparing against the end identifier, i.e., video frame 1997 image data, or counting 997 frames. It should be noted that operations 340 and 350 of FIG. 9C involve the application of the filters to suppress content as set forth in operation 240 of FIG. 9.

Application of start and end video type synchronization data or other types of synchronization data discussed herein may involve initial identification of the multimedia presentation. Thus, with the example of Table 1, a filtering application would first identify or be notified of the particular multimedia presentation, such as "Gladiator," and then would apply the appropriate metadata. It is also possible that the synchronization data of the metadata is unique only to one multimedia presentation. For example, the image synchronization data is unique to only Gladiator and no other multimedia presentation. Depending on memory size, processing speed, and other factors, an implementation may compare a plurality of sets of filter metadata to any given multimedia presentation, without first identifying the multimedia presentation. Correct filter application occurs based on the global or near global uniqueness of the identifiers.

Alternatively, the uniqueness of the synchronization data provides for identification of the multimedia data. In one example, a plurality of sets of filter metadata are locally stored on a set-top box. At the start of a presentation of the multimedia, start image synchronization data for the various sets of filter metadata are compared to the multimedia presentation. Each set of filter metadata is associated with a particular multimedia presentation; thus, upon identifying a match between filter metadata and a particular presentation, besides synchronizing the metadata, the match further identifies the multimedia presentation. The remaining presentation of the multimedia may then be compared only with the matched set of filter metadata. Stated differently, set of filter metadata for many different VOD presentations can be loaded into STB memory, and then rather than pre-identifying a particular VOD presentation and set of metadata, image synchronization may occur in real time or near real time in order to apply the appropriate metadata to the VOD being shown. Such an implementation may also be applied when moving between different multimedia presentations, such as when channel surfing. A plurality of sets of filter metadata is compared against the current multimedia presentation, and the appropriate filter is applied against the current multimedia. In such an implementation, a user may be requested to activate certain filter types that are applied to whatever multimedia is being presented, provided the multimedia has an available set of filter metadata, as opposed to activation based on a discrete multimedia presentation.

With the third implementation, timing of the multimedia presentation is optional. The third implementation is particularly useful if the multimedia presentation includes additional multimedia, such as commercials, which may unpredictably interrupt the timing of the main multimedia presentation. Using start identifier information that is disassociated with the timing of the multimedia presentation, provides one way for the metadata to be synchronized with the multimedia presentation in a manner to account for interruptions. The third implementation may take advantage of any of the various image, audio, and close captioning metadata synchronization schemes discussed above with respect to the second implementation. The synchronization technique discussed with respect to the third implementation, as well as various facets of other implementations described herein, is applicable to various forms of multimedia distribution and playback methods, including video on demand, DVD, pay-per-view, streaming video to a PC, multimedia presented on a hand-held, etc.

The distinction between the second and third implementation, is that the image, audio, and/or close captioning synchronization metadata in the first implementation is used to synchronize the metadata with the multimedia data, but timing information is used for the comparisons, whereas in the third implementation, the image, audio, and/or close captioning synchronization metadata is used directly in the comparison without necessarily further use of timing information.

However, multimedia timing information may be used along with the start and end identifier to optimize the synchronization process. In one implementation, synchronization start and end identifier data comparison may be activated at specific times. For example, upon detecting a match between a start identifier and multimedia data, some filtering action occurs. However, rather than continuously comparing the multimedia data with the end identifier, the filtering application begins comparison after some period of time. The comparison begins at a point in time sufficient to detect the point of the multimedia data associated the end identifier. In yet another possible implementation, no end identifier is necessary. The filtering application, upon detecting a match between the start identifier and some portion of multimedia data, activates a suppression action for some set period of time, which may be identified by a timer, by number of frames, by number of presentation time stamps (described in further detail below), or any other means to sufficiently identify a relative offset in the multimedia based on the identification of a discrete location in the multimedia through comparison to a start identifier.

In a fourth implementation set forth in FIG. D, one or more flags or other identifiers are provided in the video on demand data file (operation 360). The identifier is placed at a known location relative to the metadata position information. Thus, the filtered playback application may monitor the video on demand data file for the presence of the identifier. With respect to filter metadata with filters having a start and end time identification, a flag may be placed in the video on demand data file at the beginning of the multimedia presentation in order to synchronize the metadata with the multimedia data. Filtering actions are then based on timing from the identification of the flag (operation 370). Alternatively, metadata filters may each include a unique start flag. The video on demand multimedia data then includes embedded flags associated with various types of content. As the filtering application compares the multimedia data with the metadata, filtering actions occur when a flag in the multimedia data matches a corresponding start flag identifier for a filter in the filter metadata. A filtering action, in one example, may end after a specified time. Alternatively, filter metadata may also include unique end flag identifiers, and the corresponding multimedia presentation further include end flags associated with particular start flags. A filtering action thus begins upon matching a corresponding start flag identifier with a flag in the multimedia and ends by matching a end flag identifier with a flag in the multimedia.

For relative timing information for a VOD multimedia presentation, implementations of the present invention may track MPEG presentation timestamp (PTS) information. Further, in yet another possible implementation, filter metadata may include PTS information as start and end filter identifiers, either alone or in conjunction with other start and/or end identifier synchronization data.

In various implementations discussed herein, it may be necessary to account for interruptions in the multimedia presentation. For example, in a digital video recorder STB type environment or any other environment that provides the user with the ability to fast forward, rewind, or the like, synchronization may involve accounting for such interruptions. If the filter application is tracking timing as part of filter synchronization, then some implementations adjust the relative timing to account for interruptions. For example, fast forward may occur at known rates, such as two times (2×) playback speed, five times (5×) playback speed, etc. Since the fast forward rate is known, the time clock can be synchronized with the fast forwarding action. Pausing, rewinding, stopping, and other actions can be synchronized similarly.

While the disclosed embodiments are described in specific terms, other embodiments encompassing principles of the invention are also possible. Further, operations may be set forth in a particular order. The order, however, is but one example of the way that operations may be provided. Operations may be rearranged, modified, or eliminated in any particular implementation while still conforming to aspects of the invention. Embodiments within the scope of the present invention also include computer readable media for carrying or having computer-executable instructions or data structures stored thereon. Such computer-readable media may be any available media that can be accessed by a general purpose or special purpose computer. By way of example, and not limitation, such computer-readable media can comprise RAM, ROM, EEPROM, DVD, CD ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications link or connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The term content server set forth herein should be construed broadly to include a server as well as any related storage and other processing configuration involved in serving content. In a cable system and similarly in a satellite system, the content server would include a video-on-demand server and possibly related system equipment.

Those skilled in the art will appreciate that aspects of the invention may be practiced in network computing environments with many types of computer system configurations, including personal computers, lap top computers, hand-held devices, multi-processor systems, microprocessor based or programmable consumer electronics, network PCs, minicomputers, mainframe computers, and the like. Various embodiments discussed herein including embodiments involving a satellite or cable signal delivered to a set-top box, television system processor, or the like, as well as digital data signals delivered to some form of multimedia processing configuration, such as employed for IPTV, or other similar configurations can be considered as within a network computing environment. Further, wirelessly connected cell phones, a type of hand-held device, are considered as within a network computing environment. For example, cell phones include a processor, memory, display, and some form of wireless connection, whether digital or analog, and some form of input medium, such as a keyboards, touch screens, etc. Hand-held computing platforms can also include video on demand type of selection ability. Examples of wireless connection technologies applicable in various mobile embodiments include, but are not limited to, radio frequency, AM, FM, cellular, television, satellite, microwave, WiFi, blue-tooth, infrared, and the like. Hand-held computing platforms do not necessarily require a wireless connection. For example, a hand-held device may access multimedia from some form of memory, which may include both integrated memory (e.g., RAM, Flash, etc) as well as removable memory (e.g., optical storage media, memory sticks, flash memory cards, etc.) for playback on the device. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Other filter technologies configured to allow filtered playback of a movie or other multimedia presentation are described in U.S. application Ser. No. 09/694,873 titled "Multimedia Content Navigation and Playback" filed on Oct. 23, 2000, now U.S. Pat. No. 6,898,799, which issued May 24, 2005, and U.S. application Ser. No. 09/695,102 titled "Delivery of Navigation Data for Playback of Audio and Video Content" filed on Oct. 23, 2000, now U.S. Pat. No. 6,889,383 which issued May 3, 2005, which are each incorporated by reference herein.

The various methods set forth herein are applicable to filtering visual content from the multimedia by skipping the multimedia content during the presentation of the content. Each of the solutions can also be configured to filter only audio content by muting the audio on either the server side or the set-top box (STB) side. The audio filtering takes place on whichever side the filtering metadata is accessible. The muting can be triggered by synchronizing the playback location with the filtering metadata (i.e. at playback location A, mute the audio until playback location B). Moreover, the various forms of content suppression, whether skipping, muting, blurring and cropping, may be implemented on the server or client side. Finally, the terms server and client are not meant to be strictly limited a client-server environment, but are meant to more generally refer to an arrangement where content is provided from a computing apparatus at a remote location to a device located at a user location. The transmission of content from the remote location to the device may involve the Internet or other computer network configuration, cable systems, satellite systems, and wireless systems, whether or alone in combination.

We claim:

1. A method for suppressing some multimedia content of a multimedia content presentation supplied from a remote server to a client multimedia content playback device comprising:

providing a graphical user interface for selection of at least one multimedia content presentation from a plurality of selectable multimedia content presentations;

providing for activation of at least one filter to apply to the at least one multimedia content presentation, the at least one filter configured to identify a portion of the multimedia content presentation having objectionable content and further configured to implement content suppression of the objectionable content, the at least one filter further configured to identify a portion of the at least one multimedia content presentation by providing at least a start time indicator associated with a start time of the objectionable content;

providing synchronization information to synchronize a specific portion of the at least one multimedia content presentation with the start time indicator associated with a start time of the objectionable content;

providing for communication of the multimedia content presentation between the remote content server and the client device;

providing for receiving at the client device a stream of data for the at least one multimedia content presentation, wherein the stream of data suppresses at least a portion of the objectionable content identified in the at least one filter; and providing for applying the at least one filter to the multimedia content presentation at the client multimedia content playback device to suppress any remaining portion of the objectionable content identified in the at least one filter.

2. The method of claim 1 further comprising:
from the remote content server, receiving filter metadata comprising the at least one filter at the client device.

3. The method of claim 1 further comprising:
transmitting an activation of the at least one filter to the content server for storage; and
from the remote content server, receiving filter metadata comprising the at least one activated filter to the client device.

4. The method of claim 1 further comprising:
providing for activation of at least one filter of a plurality of filters, each of the plurality of filters configured to identify a different portion of the at least one multimedia content presentation, each portion having the objectionable content and further configured to implement content suppression of the objectionable content related to each of the plurality of filters; and
transmitting to the remote content server an activation of the at least one filter of the plurality of filters; and
from the remote content server, receiving filter metadata comprising the at least one activated filter to the client device, but not including inactive filters.

5. The method of claim 1 further comprising:
to the remote content server, transmitting an indication of activation of the at least one filter.

6. The method of claim 1 wherein the stream of data is a stream of MPEG Groups of Pictures and wherein the multimedia content presentation is a video-on-demand movie.

7. The method of claim 1 further comprising:
transmitting an activation of the at least one filter to the content server; and
from the remote content server, receiving the stream of data for the at least one
multimedia content presentation, wherein the remote content server suppresses at least a portion of the objectionable content identified in the at least one filter.

8. The method of claim 1 further comprising:
transmitting an indication of activation of the at least one filter to the remote content server; and
transmitting to the client device a stream of data for the at least one multimedia content presentation, wherein the stream of data suppresses all of the objectionable content identified in the at least one filter.

9. The method of claim 1 further comprising:
providing for applying the at least one filter to the multimedia content presentation to suppress the objectionable content identified in the at least one filter as a function of a user identification.

10. The method of claim 1 wherein the remote content server is a video-on-demand server and related storage and processing infrastructure.

11. The method of claim 1 wherein the remote content server is a pay-per-view server and related storage and processing infrastructure.

12. The method of claim 1 wherein the remote content server is a part of a satellite content distribution system.

13. The method of claim 1 wherein the remote content server is a part of a cable provider system.

14. The method of claim 1 wherein the multimedia content presentation is a movie provided from a video-on-demand system.

15. The method of claim 1 wherein the client device is a set-top-box.

16. The method of claim 15 wherein the set-top-box is configured for one of cable or satellite reception.

17. The method of claim 1 wherein suppression of the objectionable content includes skipping.

18. A method for applying and synchronizing multimedia content filter data with a multimedia content presentation comprising:
receiving filter data comprising at least one filter configured to identify a portion of a multimedia content presentation having objectionable content and further configured to implement content suppression of the objectionable content;
obtaining synchronization information to synchronize the at least one filter with the objectionable content when a location of the portion of the multimedia content presentation may vary, the synchronization information identifying at least one particular location in the multimedia content presentation to align the filter;
receiving the multimedia content presentation wherein some of the objectionable content is suppressed; and
presenting the multimedia content presentation at a client device including suppressing any remaining objectionable content based on the synchronization information and the filter data.

19. The method of claim 18 wherein the synchronization information comprises a time offset corresponding with a start of the multimedia content presentation.

20. The method of claim 19 wherein the at least one filter is configured to identify a portion of the multimedia content presentation having objectionable content by providing at least a start time indicator associated with a start time of the objectionable content; and further comprising:
tracking time as a function of the time offset; and
suppressing the objectionable content when the tracking time matches the start time indicator.

21. The method of claim 18 wherein the at least one filter is configured to identify a portion of a multimedia content presentation with synchronization data matching a non-time aspect of the multimedia content presentation; and further comprising:
analyzing the multimedia content presentation to identify data that matches the synchronization data.

22. The method of claim 21 wherein the at least one filter is configured to identify a portion of the multimedia content presentation having objectionable content by providing at least a start time indicator associated with a start time of the objectionable content; and further comprising:
tracking time as a function of identification of data that matches the synchronization data; and
suppressing the objectionable content when the tracking time matches the start time indicator.

23. The method of claim 22 wherein the synchronization data is at least one of image data, audio data, and close caption data.

24. The method of claim 21 further comprising:
suppressing the objectionable content upon identifying data that matches the synchronization data.

25. The method of claim 18 further comprising obtaining synchronization information from the content server to synchronize the at least one content filter with the objectionable content when the portion of the portion of the multimedia content presentation.

26. The method of claim 18 further comprising providing for transmission of the multimedia content presentation from a remote content server to the client device.

27. The method of claim 18 further comprising providing for reading of the multimedia content presentation from a removable storage media.

28. A method for suppressing some multimedia content of a multimedia content presentation supplied from a remote server to a client multimedia content playback device, comprising:
receiving a selection of at least one multimedia content presentation from a plurality of multimedia content presentations displayed at a graphical user interface associated with the client device;
transmitting filter metadata to the client device, the filter metadata including at least one filter configured to identify a portion of the multimedia content presentation having objectionable content and further configured to implement content suppression of the objectionable content;
transmitting filter synchronization data to the client device, the synchronization data identifying at least one particular location in the multimedia content presentation from which the filter metadata is synchronized so that the objectionable content identified in the filter is properly aligned with actual objectionable content in the multimedia content presentation; and
transmitting the multimedia content presentation from the remote content server to a client device such that application of the filter metadata to the multimedia content presentation will suppress at least a portion of the objectionable content identified in the filter before transmitting the multimedia content presentation to a client device and any remaining objectionable content identified in the filter metadata after transmitting the multimedia content presentation.

29. The method of claim 28 further comprising:
at the remote content server, storing an activation of the at least one filter; and
from the remote content server, transmitting filter metadata comprising the at least one activated filter to the client device.

30. The method of claim 29 further comprising transmitting synchronization information to the client device to synchronize the at least one content filter with the objectionable content when a location of the portion of the multimedia content presentation may vary.

31. The method of claim 28 further comprising:
providing for activation of at least one filter of a plurality of filters, each of the plurality of filters configured to identify a different portion of the multimedia content presentation, each portion having objectionable content and further configured to implement content suppression of the objectionable content related to each of filter; and
at the remote content server, storing an activation of the at least one filter of the plurality of filters; and
from the remote content server, transmitting filter metadata comprising the at least one activated filter to the client device, but excluding inactive filters.

32. The method of claim 28 further comprising:
at the remote content server, receiving an indication of activation of the at least one filter; and
from the remote content server, transmitting a stream of data including the multimedia content presentation from the remote content server to the client device such that application of the filter metadata to the multimedia content presentation suppresses at least a portion of the objectionable content identified in the at least one filter.

33. The method of claim 32 further comprising transmitting a stream of data including the multimedia content presentation from the remote content server to the client device such that application of the filter metadata to the multimedia content presentation suppresses all of the objectionable content identified in the at least one filter.

34. The method of claim 32 wherein the stream of data is a stream of MPEG Groups of Pictures and wherein the multimedia content presentation is a video-on-demand movie.

35. The method of claim 28 wherein the remote content server is a video-on-demand server and related storage and processing infrastructure.

36. The method of claim 28 wherein the remote content server is a part of a satellite content distribution system.

37. The method of claim 28 wherein the remote content server is a part of a cable provider system.

38. The method of claim 28 wherein the multimedia content presentation is a movie provided from a video-on-demand system.

39. The method of claim 28 wherein suppression of the objectionable content includes skipping.

40. A method for suppressing some multimedia content of a multimedia content presentation supplied from a remote server to a client multimedia content playback device comprising:
at a graphical user interface, receiving a selection of at least one multimedia content presentation from a plurality of selectable multimedia content presentations;
receiving an activation of at least one filter to apply to the at least one multimedia content presentation, the at least one filter configured to identify a portion of the multimedia content presentation having objectionable content and further configured to implement content suppression of the objectionable content, the at least one filter further configured to identify a portion of the at least one multimedia content presentation by providing at least a start time indicator associated with a start time of the objectionable content;
synchronizing a specific portion of the at least one multimedia content presentation with the start time indicator associated with a start time of the objectionable content;
receiving a stream of data for the at least one multimedia content presentation, wherein the stream of data suppresses at least a portion of the objectionable content identified in the at least one filter; and
applying the at least one filter to the multimedia content presentation to suppress any remaining portion of the objectionable content identified in the at least one filter.

* * * * *